(12) United States Patent
Komura et al.

(10) Patent No.: US 8,170,389 B1
(45) Date of Patent: May 1, 2012

(54) OPTICAL WAVEGUIDE, AND THERMALLY-ASSISTED MAGNETIC RECORDING HEAD INCLUDING THE SAME

(75) Inventors: Eiji Komura, Tokyo (JP); Tsutomu Chou, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/016,085

(22) Filed: Jan. 28, 2011

(51) Int. Cl.
*G02B 6/10* (2006.01)

(52) U.S. Cl. ............... 385/129; 360/59; 369/112.27

(58) Field of Classification Search ............... None
See application file for complete search history.

(56) References Cited

U.S. PATENT DOCUMENTS

| | | | |
|---|---|---|---|
| 4,773,720 | A | 9/1988 | Hammer |
| 6,944,112 | B2 | 9/2005 | Challener |
| 7,106,664 | B2 | 9/2006 | Hasegawa et al. |
| 7,330,404 | B2 | 2/2008 | Peng et al. |
| 2007/0230323 | A1 | 10/2007 | Nishida et al. |
| 2010/0061200 | A1* | 3/2010 | Shimazawa et al. ....... 369/13.33 |
| 2010/0103553 | A1 | 4/2010 | Shimazawa et al. |
| 2010/0315736 | A1 | 12/2010 | Takayama et al. |
| 2011/0222190 | A1* | 9/2011 | Hara et al. ............... 360/234.6 |

OTHER PUBLICATIONS

"Optical Technologies and Applications", *Intel Technology Journal*, vol. 8, Issue 2, May 10, 2004.
U.S. Appl. No. 12/720,083, filed Mar. 9, 2010 in the name of Komura et al.
U.S. Appl. No. 12/659,094, filed Feb. 25, 2010 in the name of Komura et al.

* cited by examiner

*Primary Examiner* — Paul Huber
(74) *Attorney, Agent, or Firm* — Oliff & Berridge, PLC

(57) ABSTRACT

An optical waveguide includes a core and a clad. The core includes first to third propagation parts, and a coupling part that couples the first to third propagation parts together. The first propagation part has a first incidence end face on which part of incident light is incident, and a first emission part that emits first propagation light. The second propagation part has a second incidence end face on which another part of the incident light is incident, and a second emission part that emits second propagation light. In the coupling part, a first light wave resulting from the first propagation light and a second light wave resulting from the second propagation light occur, and the first and second light waves interfere with each other to generate third propagation light to be emitted from a third emission part. The third propagation part propagates the third propagation light.

11 Claims, 15 Drawing Sheets

OPTICAL WAVEGUIDE, AND THERMALLY-ASSISTED MAGNETIC RECORDING HEAD INCLUDING THE SAME

BACKGROUND OF THE INVENTION

1. Field of the Invention

The present invention relates to an optical waveguide having the function of making the diameter of propagating light smaller than that of incident light, and to a thermally-assisted magnetic recording head including the same.

2. Description of the Related Art

Recently, magnetic recording devices such as magnetic disk drives have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) intended for reading and a write head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data writing with existing magnetic heads.

To solve the aforementioned problems, there has been proposed a technology so-called thermally-assisted magnetic recording. The technology uses a magnetic recording medium having high coercivity. When writing data, a magnetic field and heat are simultaneously applied to the area of the magnetic recording medium where to write data, so that the area rises in temperature and drops in coercivity for data writing. Hereinafter, a magnetic head for use in thermally-assisted magnetic recording will be referred to as a thermally-assisted magnetic recording head.

In thermally-assisted magnetic recording, near-field light is typically used as a means for applying heat to the magnetic recording medium. A known method for generating near-field light is to use a plasmon generator, which is a piece of metal that generates near-field light from plasmons excited by irradiation with laser light. The laser light to be used for generating the near-field light is typically guided through an optical waveguide provided in the slider to the plasmon generator disposed near the medium facing surface of the slider.

U.S. Patent Application Publication No. 2010/0103553 A1 discloses a technology for coupling light that propagates through an optical waveguide with a plasmon generator in surface plasmon mode via a buffer part, thereby exciting surface plasmons on the plasmon generator.

When using the aforementioned technology, it is preferred that the light propagating through the optical waveguide be in single mode in the vicinity of the plasmon generator so that surface plasmons are excited on the plasmon generator with high efficiency. Meanwhile, the optical waveguide needs to have a high tolerance for misalignment of the incident light with respect to its incidence part and be able to propagate the incident light with high efficiency.

In order to increase the tolerance for the misalignment of the incident light with respect to the incidence part of the optical waveguide and promote efficient propagation of the incident light through the optical waveguide, the cross section of the optical waveguide perpendicular to the traveling direction of the light propagating through the optical waveguide may be increased in area. This, however, causes the light propagating through the optical waveguide to enter multi mode, thus precluding efficient excitation of surface plasmons on the plasmon generator.

Another approach is to use, as at least part of the optical waveguide, a spot size converter for making the spot size of the emission light smaller than that of the incident light. Such a spot size converter is disclosed in, for example, the document "Optical Technologies and Applications," Intel Technology Journal, Vol. 8, Issue 2, pp. 153-156, May 10, 2004.

Some spot size converters for making the spot size of the emission light smaller than that of the incident light have a structure such as disclosed in the aforementioned document, where a first waveguide part having a first incidence end face and an emission end face is stacked with a wedge-shaped second waveguide part having a second incidence end face. Hereinafter, a spot size converter of such a structure will be referred to as a layered spot size converter.

In the layered spot size converter, light is incident on the first and second incidence end faces and propagates through the first and second waveguide parts. The cross section of the second waveguide part perpendicular to the traveling direction of the light decreases in area with increasing distance from the second incidence end face. This makes it difficult for the light that propagates through the second waveguide part to remain in the second waveguide part, and the light eventually moves to the first waveguide part.

In the layered spot size converter, the second waveguide part needs to be sharply pointed at its front end side (the side opposite from the second incidence end face) in order to make the light propagating through the second waveguide part move to the first waveguide part with high efficiency. For example, the front end of the second waveguide part has a radius of curvature of around 0.1 µm.

Now, problems with the layered spot size converter will be described. At the second incidence end face, the second waveguide part has a thickness and a width of, for example, several micrometers each. The second waveguide part has a length of several tens to several hundreds of micrometers, for example. In this case, the second waveguide part gradually decreases in width from several micrometers to near zero across the length of several tens to several hundreds of micrometers. This means that the second waveguide part has an extremely high thickness-to-width ratio (aspect ratio) in the vicinity of its front end in particular. The second waveguide part having such a configuration is extremely difficult to form. An example of methods for forming the second waveguide part is to form a photoresist etching mask on a dielectric layer by photolithography and pattern the dielectric layer by etching using the etching mask. In such a case, the etching mask has a portion of extremely high aspect ratio and is thus prone to collapse. Having a portion of extremely high aspect ratio, the second waveguide part itself is also vulnerable to chipping.

In the layered spot size converter, the first and second incidence end faces collectively form a single surface constituting an incidence part. Given that the spot size of the incident light is generally the same as the size of the incidence part, the tolerance for misalignment of the incident light with respect to the incidence part is not much increased in such a case.

OBJECTS AND SUMMARY OF THE INVENTION

A first object of the present invention is to provide an optical waveguide that need not have a portion of extremely high aspect ratio, can make the diameter of propagating light smaller than that of incident light, and allows a high tolerance for misalignment of the incident light with respect to the incidence part.

A second object of the present invention is to provide a thermally-assisted magnetic recording head that includes such an optical waveguide as described above, and to provide a head gimbal assembly and a magnetic recording device in which the thermally-assisted magnetic recording head is incorporated.

An optical waveguide of the present invention includes a core and a clad, and allows incident light to be incident thereon. The core includes a first propagation part, a second propagation part, a third propagation part, and a coupling part that couples the first to third propagation parts together. The first propagation part has a first incidence end face on which part of the incident light is incident, and a first emission part that emits first propagation light, the first propagation light being light that has been incident on the first incidence end face and propagated through the first propagation part. The second propagation part has a second incidence end face on which another part of the incident light is incident, and a second emission part that emits second propagation light, the second propagation light being light that has been incident on the second incidence end face and propagated through the second propagation part. The first propagation part and the second propagation part are spaced apart from each other.

The coupling part includes a first incidence part on which the first propagation light emitted from the first emission part is incident, a second incidence part on which the second propagation light emitted from the second emission part is incident, and a third emission part. In the coupling part, a first light wave resulting from the first propagation light incident on the first incidence part and a second light wave resulting from the second propagation light incident on the second incidence part occur, and the first and second light waves interfere with each other to generate third propagation light, the third propagation light being light to be emitted from the third emission part. The third propagation part has a third incidence part on which the third propagation light emitted from the third emission part is incident. The third propagation part propagates the third propagation light.

In the optical waveguide of the present invention, part of the incident light is incident on the first incidence end face of the first propagation part, while another part of the incident light is incident on the second incidence end face of the second propagation part. The first propagation light having propagated through the first propagation part is emitted from the first emission part and incident on the first incidence part of the coupling part. The second propagation light having propagated through the second propagation part is emitted from the second emission part and incident on the second incidence part of the coupling part. In the coupling part, a first light wave resulting from the first propagation light incident on the first incidence part and a second light wave resulting from the second propagation light incident on the second incidence part occur, and the first and second light waves interfere with each other to generate third propagation light to be emitted from the third emission part. The third propagation light is incident on the third incidence part of the third propagation part and propagates through the third propagation part.

In the optical waveguide of the present invention, the third propagation part may propagate the third propagation light in single mode.

In the optical waveguide of the present invention, the first light wave may occur from interference of a plurality of light waves that each result from the first propagation light incident on the first incidence part and that are different from each other in the number of times of reflection (including zero times) by an outer periphery of the coupling part. The second light wave may occur from interference of a plurality of light waves that each result from the second propagation light incident on the second incidence part and that are different from each other in the number of times of reflection (including zero times) by the outer periphery of the coupling part.

In the optical waveguide of the present invention, the first propagation part and the second propagation part may be of identical shape.

In the optical waveguide of the present invention, the first propagation part may include a first tapered portion whose cross section perpendicular to a traveling direction of the first propagation light decreases in area with decreasing distance to the first emission part. The second propagation part may include a second tapered portion whose cross section perpendicular to a traveling direction of the second propagation light decreases in area with decreasing distance to the second emission part.

In the optical waveguide of the present invention, the first propagation part may further include a first straight portion that lies between the first tapered portion and the first emission part, a cross section of the first straight portion perpendicular to the traveling direction of the first propagation light being constant in area regardless of the distance from the first emission part. The second propagation part may further include a second straight portion that lies between the second tapered portion and the second emission part, a cross section of the second straight portion perpendicular to the traveling direction of the second propagation light being constant in area regardless of the distance from the second emission part. In such a case, the first straight portion may propagate the first propagation light in single mode. The second straight portion may propagate the second propagation light in single mode.

A thermally-assisted magnetic recording head of the present invention includes the optical waveguide of the present invention and a magnetic pole that produces a write magnetic field for writing data on a magnetic recording medium. The optical waveguide propagates light that is for use in thermally-assisted magnetic recording.

The thermally-assisted magnetic recording head of the present invention may further include a plasmon generator that allows a surface plasmon to be excited thereon based on the light propagating through the optical waveguide and that generates near-field light based on the surface plasmon.

A head gimbal assembly of the present invention includes the thermally-assisted magnetic recording head of the present invention and a suspension that supports the thermally-assisted magnetic recording head. A magnetic recording device of the present invention includes: a magnetic recording medium; the thermally-assisted magnetic recording head of the present invention; and a positioning device that supports the thermally-assisted magnetic recording head and positions the same with respect to the magnetic recording medium.

According to the optical waveguide of the present invention, the incident light incident on across the first and second incidence end faces can be converted into the third propagation light to propagate through a single third propagation part. This can make the diameter of the third propagation light smaller than that of the incident light. In the optical waveguide of the present invention, the first propagation part and the second propagation part are spaced apart from each other. The first incidence end face and the second incidence end face are therefore also spaced apart from each other. Consequently, according to the optical waveguide of the present invention, the tolerance for misalignment of the incident light with respect to the incidence part including the first and second incidence end faces can be made greater than that in the case of using a spot size converter having an incidence part composed of a single surface. Unlike the layered spot size converter, the optical waveguide of the present invention need not have a portion of extremely high aspect ratio. Consequently, the optical waveguide of the present invention eliminates the need for a portion of extremely high aspect ratio, allows the diameter of the propagation light to be smaller than that of the incident light, and provides an increased tolerance for misalignment of the incident light with respect to the incidence part. The aforementioned advantages can also be provided by the thermally-assisted magnetic recording head including the optical waveguide of the present invention, and the head gimbal assembly and the magnetic recording device in which the thermally-assisted magnetic recording head is incorporated.

Other and further objects, features and advantages of the present invention will appear more fully from the following description.

DETAILED DESCRIPTION OF THE PREFERRED EMBODIMENT

Figure 7:
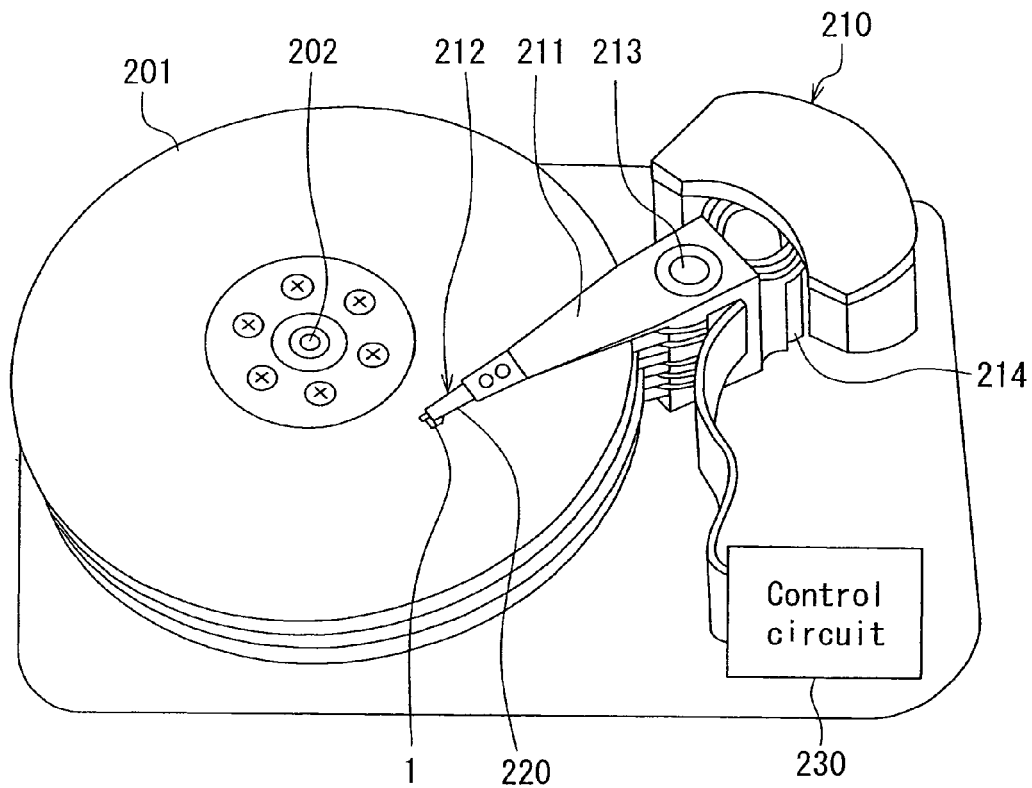
FIG. 7 is a perspective view of a magnetic recording device according to the embodiment of the invention.

A preferred embodiment of the present invention will now be described in detail with reference to the drawings. First, reference is made to FIG. 7 to describe a magnetic disk drive as a magnetic recording device according to an embodiment of the invention. As shown in FIG. 7, the magnetic disk drive includes a plurality of magnetic disks 201 as a plurality of magnetic recording media, and a spindle motor 202 for rotating the magnetic disks 201. The magnetic disks 201 of the embodiment are for use in perpendicular magnetic recording. Each magnetic disk 201 has such a structure that a soft magnetic backing layer, a middle layer, and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a thermally-assisted magnetic recording head 1 according to the embodiment, and a suspension 220 that supports the thermally-assisted magnetic recording head 1.

The assembly carriage device 210 is a device for positioning each thermally-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device of the present invention is not structurally limited to the magnetic disk drive having the above-described configuration. For example, the magnetic recording device of the present invention may be provided with a single magnetic disk 201, a single driving arm 211, a single head gimbal assembly 212 and a single thermally-assisted magnetic recording head 1.

The magnetic disk drive further includes a control circuit 230 that controls the read/write operations of the thermally-assisted magnetic recording heads 1 and also controls the light emitting operation of a laser diode serving as a light source for generating laser light for thermally-assisted magnetic recording described later.

Figure 8:
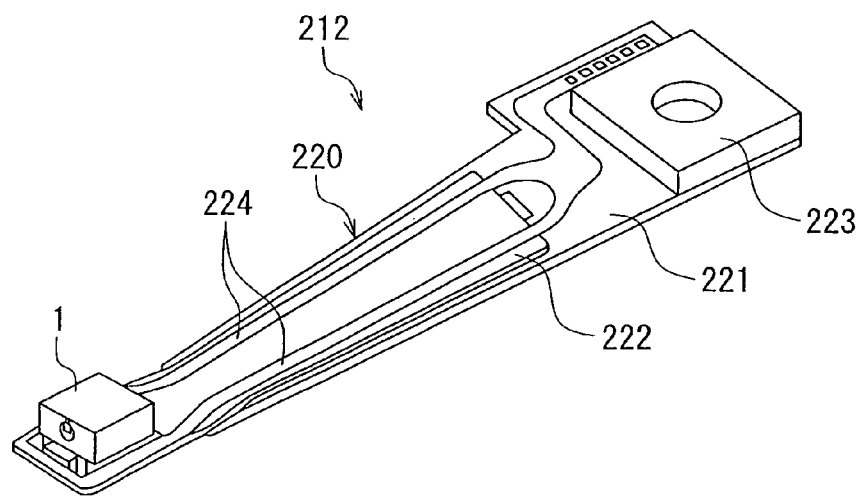
FIG. 8 is a perspective view of a head gimbal assembly according to the embodiment of the invention.

FIG. 8 is a perspective view showing the head gimbal assembly 212 of FIG. 7. As previously described, the head gimbal assembly 212 includes the thermally-assisted magnetic recording head 1 and the suspension 220. The suspension 220 has a load beam 221, a flexure 222 secured to the load beam 221 and having flexibility, a base plate 223 provided at the base part of the load beam 221, and a wiring member 224 provided on the load beam 221 and the flexure 222. The wiring member 224 includes a plurality of leads. The thermally-assisted magnetic recording head 1 is secured to the flexure 222 at the distal end of the suspension 220 such that the head 1 faces the surface of the magnetic disk 201 with a predetermined spacing (flying height). One end of the wiring member 224 is electrically connected to a plurality of terminals of the thermally-assisted magnetic recording head 1. The other end of the wiring member 224 is provided with a plurality of pad-shaped terminals arranged at the base part of the load beam 221.

The assembly carriage device 210 and the suspension 220 correspond to the positioning device of the present invention. The head gimbal assembly of the present invention is not limited to one having the configuration shown in FIG. 8. For example, the head gimbal assembly of the present invention may have an IC chip for driving the head that is mounted somewhere along the suspension 220.

Figure 9:
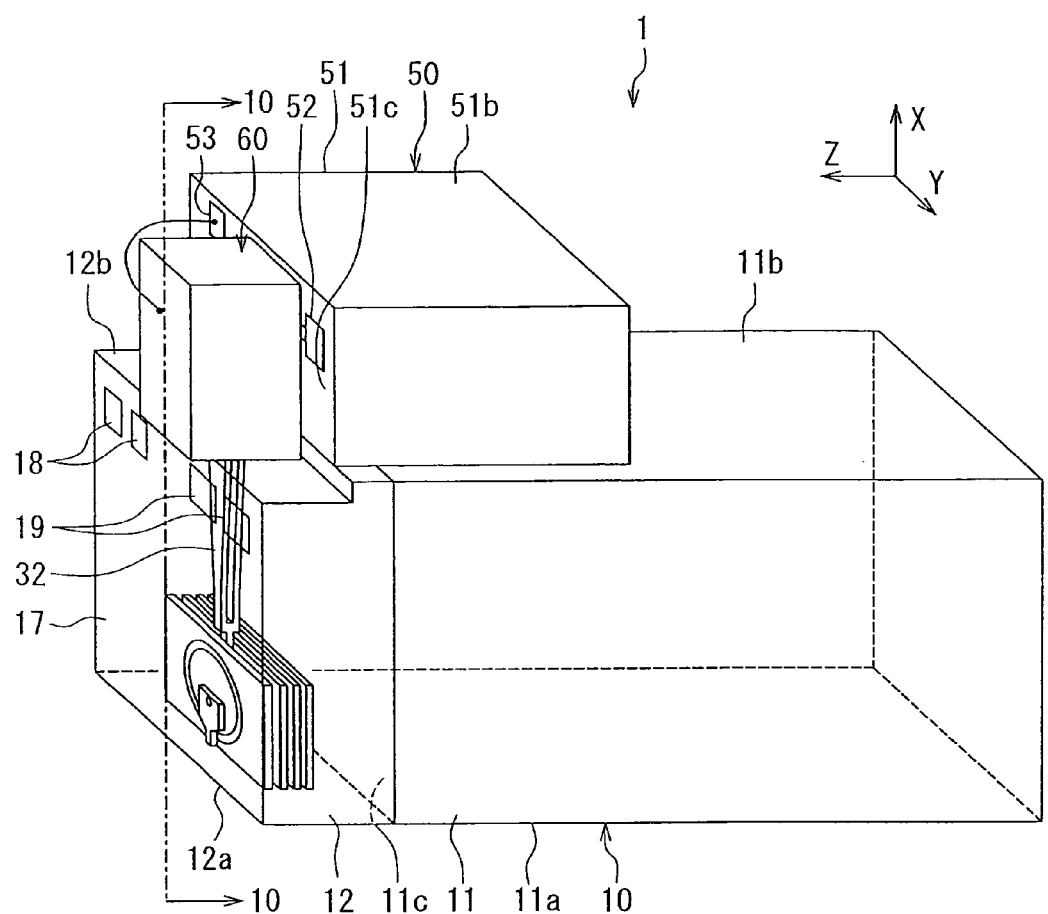
FIG. 9 is a perspective view of the thermally-assisted magnetic recording head according to the embodiment of the invention.
Figure 10:
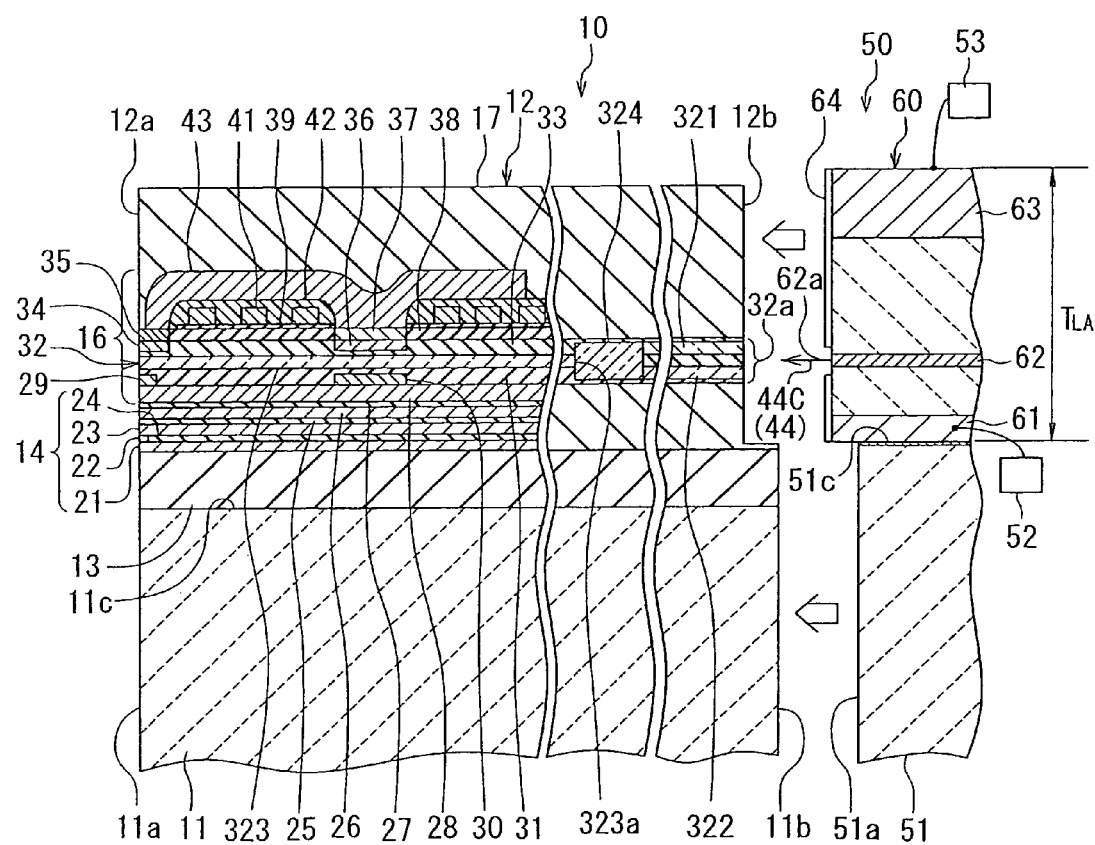
FIG. 10 shows a cross section taken along line 10-10 of FIG. 9.
Figure 11:
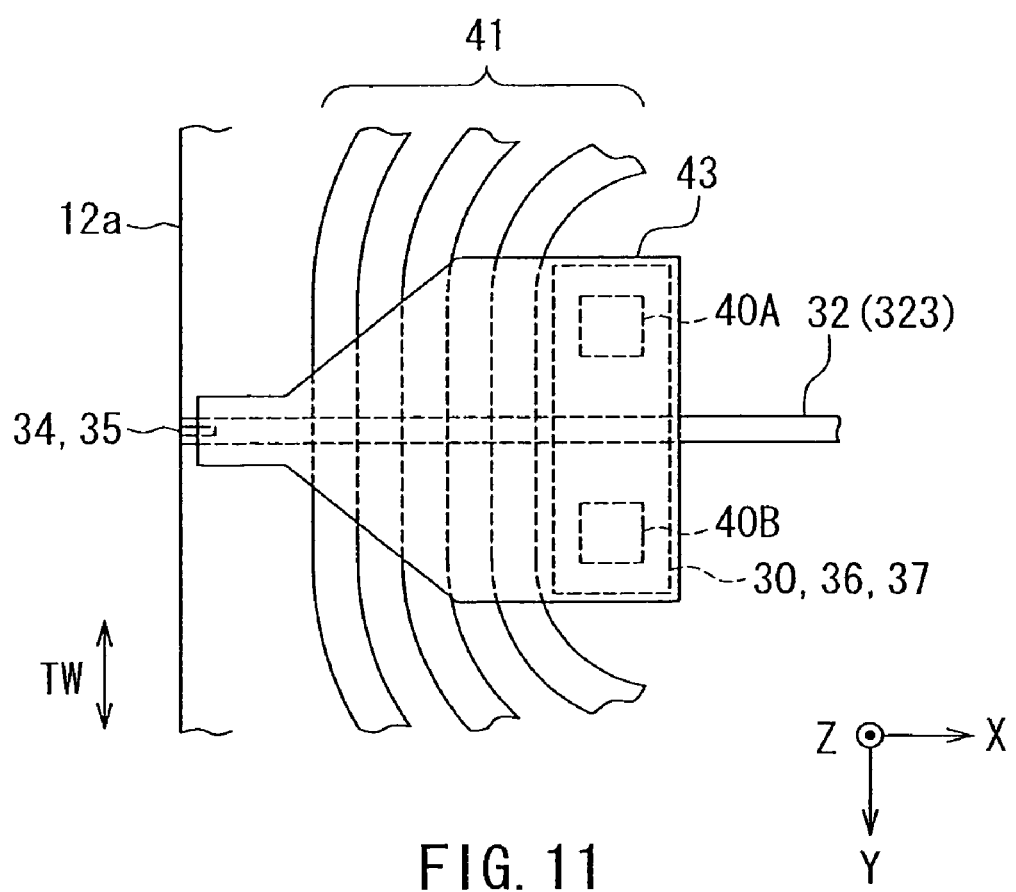
FIG. 11 is a plan view showing a part of a head unit of the thermally-assisted magnetic recording head according to the embodiment of the invention.

The configuration of the thermally-assisted magnetic recording head 1 according to the embodiment will now be described with reference to FIG. 9 to FIG. 11. FIG. 9 is a perspective view of the thermally-assisted magnetic recording head 1. FIG. 10 shows a cross section taken along line 10-10 of FIG. 9. FIG. 11 is a plan view showing a part of a head unit of the thermally-assisted magnetic recording head 1. The thermally-assisted magnetic recording head 1 includes a slider 10 and a light source unit 50. FIG. 10 shows a state where the slider 10 and the light source unit 50 are separated from each other.

The slider 10 includes a slider substrate 11 and a head unit 12. The slider substrate 11 is in the shape of a rectangular solid and is made of a ceramic material such as aluminum oxide-titanium carbide ($Al_2O_3$—TiC). The slider substrate 11 has a medium facing surface 11a that faces the magnetic disk 201, a rear surface 11b opposite to the medium facing surface 11a, and four surfaces connecting the medium facing surface 11a to the rear surface 11b. One of the four surfaces connecting the medium facing surface 11a to the rear surface 11b is an element-forming surface 11c. The element-forming surface 11c is perpendicular to the medium facing surface 11a. The head unit 12 is disposed on the element-forming surface 11c. The medium facing surface 11a is processed so as to obtain an appropriate flying height of the slider 10 from the magnetic disk 201. The head unit 12 has a medium facing surface 12a that faces the magnetic disk 201, and a rear surface 12b opposite to the medium facing surface 12a. The medium facing surface 12a is parallel to the medium facing surface 11a of the slider substrate 11.

Where the components of the head unit 12 are concerned, with respect to a reference position, a position located in a direction that extends perpendicular to the element-forming surface 11c and away from the element-forming surface 11c is defined as "above", and a position located in a direction opposite to the aforementioned direction is defined as "below". Where the layers included in the head unit 12 are concerned, the surface closer to the element-forming surface 11c is defined as a "bottom surface," and the surface farther from the element-forming surface 11c as a "top surface."

Moreover, X direction, Y direction, Z direction, -X direction, -Y direction, and -Z direction will be defined as follows. The X direction is a direction perpendicular to the medium facing surface 11a and from the medium facing surface 11a to the rear surface 11b. The Y direction is a direction parallel to the medium facing surface 11a and the element-forming surface 11c and from the back side to the front side of FIG. 10. The Z direction is a direction that extends perpendicular to the element-forming surface 11c and away from the element-forming surface 11c. The -X direction, the -Y direction, and the -Z direction are opposite to the X direction, the Y direction, and the Z direction, respectively. As viewed from the slider 10, the magnetic disk 201 moves in the Z direction. The slider 10 has an air inflow end (a leading end) at the end of the medium facing surface 11a in the -Z direction. The slider 10 has an air outflow end (a trailing end) at the end of the medium facing surface 12a in the Z direction. Track width direction TW is parallel to the Y direction.

The light source unit 50 includes a laser diode 60 serving as a light source for emitting laser light, and a support member 51 that is in the shape of a rectangular solid and supports the laser diode 60. The support member 51 is made of, for example, a ceramic material such as aluminum oxide-titanium carbide ($Al_2O_3$—TiC). The support member 51 has a bond surface 51a, a rear surface 51b opposite to the bond surface 51a, and four surfaces connecting the bond surface 51a to the rear surface 51b. One of the four surfaces connecting the bond surface 51a to the rear surface 51b is a light source mount surface 51c. The bond surface 51a is the surface to be bonded to the rear surface 11b of the slider substrate 11. The light source mount surface 51c is perpendicular to the bond surface 51a and parallel to the element-forming surface 11c. The laser diode 60 is mounted on the light source mount surface 51c. The support member 51 may function as a heat sink for dissipating heat generated by the laser diode 60, as well as serving to support the laser diode 60.

As shown in FIG. 10, the head unit 12 includes an insulating layer 13 disposed on the element-forming surface 11c, and also includes a read head 14, a write head 16, and a protection layer 17 that are stacked in this order on the insulating layer 13. The insulating layer 13 and the protection layer 17 are each made of an insulating material such as $Al_2O_3$ (hereinafter, also referred to as alumina).

The read head 14 includes: a bottom shield layer 21 disposed on the insulating layer 13; an MR element 22 disposed on the bottom shield layer 21; a top shield layer 23 disposed on the MR element 22; and an insulating layer 24 disposed between the bottom shield layer 21 and the top shield layer 23 around the MR element 22. The bottom shield layer 21 and the top shield layer 23 are each made of a soft magnetic material. The insulating layer 24 is made of an insulating material such as alumina.

An end of the MR element 22 is located in the medium facing surface 12a. The MR element may be a giant magnetoresistive (GMR) element or a tunneling magnetoresistive (TMR) element, for example. The GMR element may be of either the current-in-plane (CIP) type in which a sense current for use in magnetic signal detection is fed in a direction generally parallel to the plane of layers constituting the GMR element or the current-perpendicular-to-plane (CPP) type in which the sense current is fed in a direction generally perpendicular to the plane of layers constituting the GMR element. If the MR element 22 is a TMR element or a CPP-type GMR element, the bottom shield layer 21 and the top shield layer 23 may also function as electrodes for feeding the sense current to the MR element 22. If the MR element 22 is a CIP-type GMR element, insulating films are respectively provided between the MR element 22 and the bottom shield layer 21 and between the MR element 22 and the top shield layer 23, and two leads are provided between these insulating films in order to feed the sense current to the MR element 22.

The head unit 12 further includes: an insulating layer 25 disposed on the top shield layer 23; a middle shield layer 26 disposed on the insulating layer 25; and an insulating layer 27 disposed on the middle shield layer 26. The middle shield layer 26 functions to shield the MR element 22 from a magnetic field produced in the write head 16. The insulating layers 25 and 27 are each made of an insulating material such as alumina. The middle shield layer 26 is made of a soft magnetic material. The insulating layer 25 and the middle shield layer 26 may be omitted.

The write head 16 of the embodiment is for use in perpendicular magnetic recording. The write head 16 includes: a bottom yoke layer 28 disposed on the insulating layer 27; a bottom shield layer 29 disposed on the bottom yoke layer 28 in the vicinity of the medium facing surface 12a; and a coupling layer 30 disposed on the bottom yoke layer 28 at a position away from the medium facing surface 12a. The bottom yoke layer 28, the bottom shield layer 29, and the coupling layer 30 are each made of a soft magnetic material.

The write head 16 further includes an optical waveguide according to the embodiment. The optical waveguide propagates light that is for use in thermally-assisted magnetic recording. The optical waveguide includes a core 32 and a clad. The clad includes a clad layer 31 and a clad layer 33. The clad layer 31 covers the bottom yoke layer 28, the bottom shield layer 29 and the coupling layer 30. The core 32 lies on the clad layer 31. The clad layer 33 covers the clad layer 31 and the core 32. The core 32 extends in the direction perpendicular to the medium facing surface 12a (the X direction). The core 32 has an incidence part 32a, and a front end face opposite thereto. The core 32 propagates laser light that is emitted from the laser diode 60 and incident on the incidence part 32a.

The core 32 is made of a dielectric material or a semiconductor material that transmits the laser light. Each of the clad layers 31 and 33 is made of a dielectric material and has a refractive index lower than that of the core 32. The core 32 has a refractive index in the range of 1.5 to 3.5, for example. The clad layers 31 and 33 each have a refractive index in the range of 1.4 to 2.0, for example. The core 32 may be made of, for example, tantalum oxide, magnesium oxide, zirconium oxide, titanium oxide, silicon oxynitride (SiON), aluminum oxynitride (AlON), or silicon. The clad layers 31 and 33 may be made of, for example, aluminum oxide, magnesium oxide, silicon oxide, silicon oxynitride, or aluminum oxynitride.

The write head 16 further includes a plasmon generator 34 disposed above the core 32 in the vicinity of the medium facing surface 12a, and a magnetic pole 35 disposed at such a position that the plasmon generator 34 is interposed between the magnetic pole 35 and the core 32. The plasmon generator 34 is made of a conductive material such as metal. For example, the plasmon generator 34 may be made of one of Au, Ag, Al, Pd, Pt, Mg, Cu, In, Rh, Ir, and Ru, or an alloy composed of two or more of these materials. The magnetic pole 35 is made of a soft magnetic material, or a magnetic metal material in particular. The configurations and arrangement of the core 32, the plasmon generator 34 and the magnetic pole 35 will be detailed later.

The write head 16 further includes a coupling layer 36 embedded in the clad layer 33 at a position away from the medium facing surface 12a, and a coupling layer 37 lying on the coupling layer 36. The coupling layers 36 and 37 are located above the coupling layer 30. The coupling layers 36 and 37 are each made of a soft magnetic material.

As shown in FIG. 11, the write head 16 further includes two coupling portions 40A and 40B embedded in the clad layers 31 and 33. The coupling portions 40A and 40B are each made of a soft magnetic material. The coupling portions 40A and 40B are located on opposite sides of the core 32 in the track width direction TW, each at a distance from the core 32. The bottom surfaces of the coupling portions 40A and 40B are in contact with the top surface of the coupling layer 30. The top surfaces of the coupling portions 40A and 40B are in contact with the bottom surface of the coupling layer 36.

The write head 16 further includes: an insulating layer 38 disposed around the magnetic pole 35 and the coupling layer 37; an insulating layer 39 disposed on the insulating layer 38; a coil 41 disposed on the insulating layer 39; and an insulating layer 42 covering the coil 41. The insulating layers 38 and 39 are each made of an insulating material such as alumina. The coil 41 is planar spiral-shaped and wound around the coupling layer 37. The coil 41 produces a magnetic field corresponding to data to be written on the magnetic disk 201. The coil 41 is made of a conductive material such as copper. The insulating layer 42 is made of photoresist, for example.

The write head 16 further includes a top yoke layer 43. The top yoke layer 43 is disposed over the magnetic pole 35, the insulating layer 42 and the coupling layer 37. The top yoke layer 43 is in contact with the top surface of the magnetic pole 35 at a position near the medium facing surface 12a, and in contact with the top surface of the coupling layer 37 at a position away from the medium facing surface 12a. The top yoke layer 43 is made of a soft magnetic material.

In the write head 16, a magnetic path for passing a magnetic flux corresponding to the magnetic field produced by the coil 41 is formed by the bottom shield layer 29, the bottom yoke layer 28, the coupling layer 30, the coupling portions 40A and 40B, the coupling layers 36 and 37, the top yoke layer 43, and the magnetic pole 35. The magnetic pole 35 has an end face located in the medium facing surface 12a, allows the magnetic flux corresponding to the magnetic field produced by the coil 41 to pass, and produces a write magnetic field for writing data on the magnetic disk 201 by means of the perpendicular magnetic recording system. The bottom shield layer 29 captures a magnetic flux that is generated from the end face of the magnetic pole 35 and that expands in directions other than the direction perpendicular to the plane of the magnetic disk 201, and thereby prevents the magnetic flux from reaching the magnetic disk 201.

As shown in FIG. 10, the protection layer 17 is disposed to cover the write head 16. As shown in FIG. 9, the head unit 12 further includes a pair of terminals 18 that are disposed on the top surface of the protection layer 17 and electrically connected to the MR element 22, and another pair of terminals 19 that are disposed on the top surface of the protection layer 17 and electrically connected to the coil 41. These terminals 18 and 19 are electrically connected to four of the plurality of pad-shaped terminals of the wiring member 224 shown in FIG. 8.

The laser diode 60 may be a laser diode of InP type, GaAs type, GaN type or the like that is commonly used for such applications as communications, optical disc storage and material analysis. The laser diode 60 preferably emits laser light of wavelength within the range of 400 to 1000 nm, more preferably within the range of 600 to 850 nm.

As shown in FIG. 10, the laser diode 60 has a multilayer structure including a lower electrode 61, an active layer 62, and an upper electrode 63. A reflecting layer 64 made of, for example, $SiO_2$ or $Al_2O_3$, is formed on two cleavage planes of the multilayer structure so as to excite oscillation by total reflection of light. The reflecting layer 64 has an opening for emitting laser light in the position of the active layer 62 including an emission center 62a. The laser diode 60 has a thickness $T_{LA}$ of around 60 to 200 for example.

The light source unit 50 further includes a terminal 52 disposed on the light source mount surface 51c and electrically connected to the lower electrode 61, and a terminal 53 disposed on the light source mount surface 51c and electrically connected to the upper electrode 63. These terminals 52 and 53 are electrically connected to two of the plurality of pad-shaped terminals of the wiring member 224 shown in FIG. 9. When a predetermined voltage is applied to the laser diode 60 through the terminals 52 and 53, laser light is emitted from the emission center 62a of the laser diode 60. The laser light emitted from the laser diode 60 is preferably TM-mode polarized light whose electric field oscillates in a direction perpendicular to the plane of the active layer 62.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

The light source unit 50 is secured to the slider 10 by bonding the bond surface 51a of the support member 51 to the rear surface 11b of the slider substrate 11, as shown in FIG. 10. The laser diode 60 and the core 32 are positioned with respect to each other so that the laser light emitted from the laser diode 60 will be incident on the incidence part 32a of the core 32.

Figure 1:
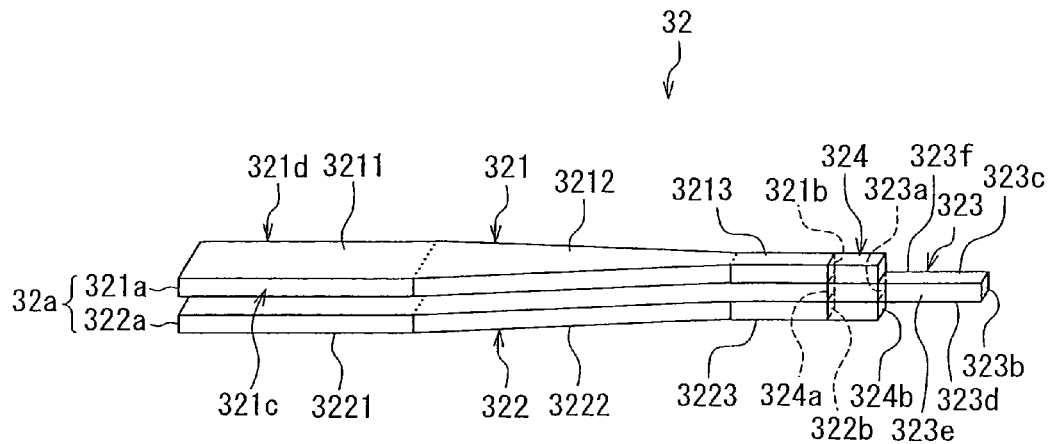
FIG. 1 is a perspective view of a core of an optical waveguide according to an embodiment of the invention.
Figure 2:
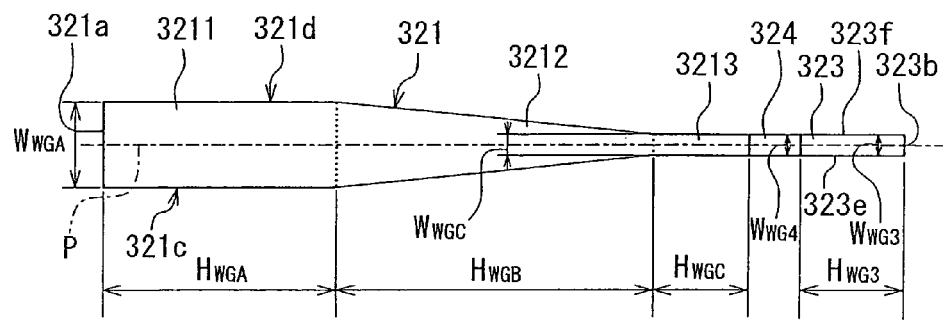
FIG. 2 is a plan view of the core of the optical waveguide according to the embodiment of the invention.
Figure 3:
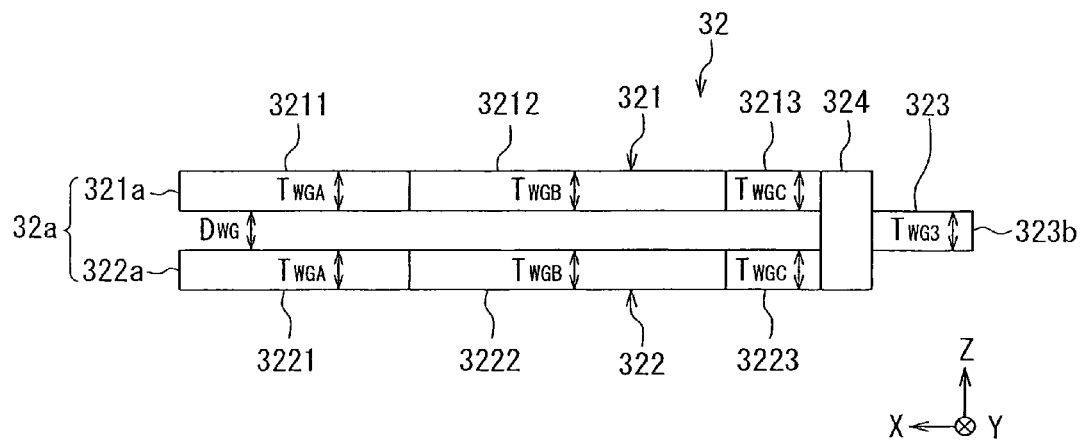
FIG. 3 is a side view of the core of the optical waveguide according to the embodiment of the invention.
Figure 4:
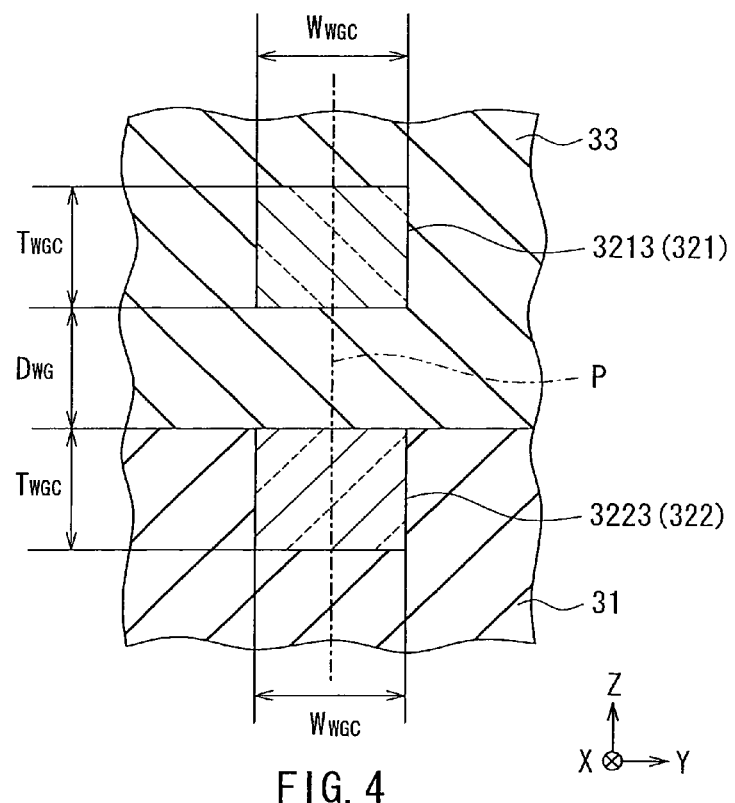
FIG. 4 is a cross-sectional view of the core of the optical waveguide according to the embodiment of the invention.
Figure 5:
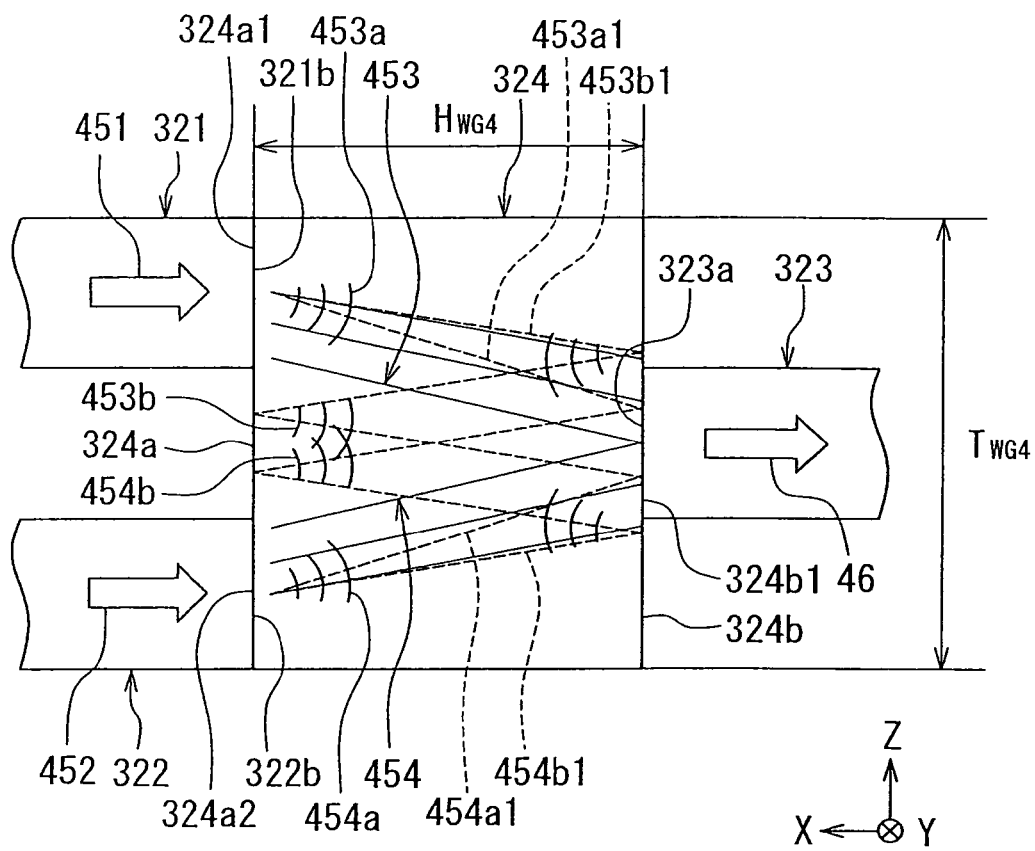
FIG. 5 is a cross-sectional view showing a coupling part of the core shown in FIG. 3 and its vicinity.

Reference is now made to FIG. 1 to FIG. 5 to describe the core 32 in detail. FIG. 1 is a perspective view of the core 32. FIG. 2 is a plan view of the core 32. FIG. 3 is a side view of the core 32. FIG. 4 is a cross-sectional view of part of the optical waveguide. FIG. 5 is a cross-sectional view showing a coupling part of the core 32 and its vicinity. The X, Y, and Z directions shown in FIG. 10 are also shown in FIG. 1 to FIG. 5.

The core 32 includes a first propagation part 321, a second propagation part 322, a third propagation part 323, and a coupling part 324 that couples the first to third propagation parts 321, 322 and 323 together. Each of the first and second propagation parts 321 and 322 extends in the −X direction from the rear surface 12b to a predetermined position that does not reach the medium facing surface 12a. The third propagation part 323 extends in the −X direction from a position that is closer to the medium facing surface 12a than is the aforementioned position.

The first propagation part 321 and the second propagation part 322 are spaced apart from each other in the direction perpendicular to the element-forming surface 11c (the Z direction). In the example shown in FIG. 1 to FIG. 5, the first propagation part 321 is located above the second propagation part 322. As shown in FIG. 2 and FIG. 4, an imaginary plane that includes the center of the incident light and is perpendicular to the element-forming surface 11c will be designated by the symbol P. The first propagation part 321 and the second propagation part 322 are of identical shape that is symmetrical about the imaginary plane P.

The first propagation part 321 has: a first incidence end face 321a on which part of the laser light that is emitted from the laser diode 60 to be incident on the core 32 (hereinafter referred to as incident light) is incident; a first emission part 321b that emits first propagation light which is light having been incident on the first incidence end face 321a and propagated through the first propagation part 321; two side surfaces 321c and 321d; a top surface; and a bottom surface. The first incidence end face 321a constitutes part of the incidence part 32a of the core 32. Both the first incidence end face 321a and the first emission part 321b are rectangular in shape, for example. The side surfaces 321c and 321d may be perpendicular to the element-forming surface 11c or oblique to the direction perpendicular to the element-forming surface 11c. In the first propagation part 321, the first propagation light travels in the direction in which the first propagation part 321 extends, i.e., in the −X direction.

The first propagation part 321 includes a first introducing portion 3211, a first tapered portion 3212, and a first straight portion 3213. In FIG. 1 and FIG. 2, the borders between these portions are shown by dotted lines. When viewed in respective cross sections perpendicular to the traveling direction of the first propagation light (the −X direction), the first introducing portion 3211, the first tapered portion 3212, and the first straight portion 3213 are all rectangular in shape, for example.

The cross section of the first tapered portion 3212 perpendicular to the traveling direction of the first propagation light decreases in area with decreasing distance to the first emission part 321b. In the example shown in FIG. 1 to FIG. 3, the first tapered portion 3212 has a constant thickness in the Z direction regardless of the distance from the first emission part 321b. The width of the first tapered portion 3212 in the Y direction decreases with decreasing distance to the first emission part 321b.

The first introducing portion 3211 lies between the first tapered portion 3212 and the first incidence end face 321a. The cross section of the first introducing portion 3211 perpendicular to the traveling direction of the first propagation light has a constant area and shape regardless of the distance from the first incidence end face 321a. The cross sections of the first introducing portion 3211 and the first tapered portion 3212 perpendicular to the traveling direction of the first propagation light have the same shape at the border between the first introducing portion 3211 and the first tapered portion 3212.

The first straight portion 3213 lies between the first tapered portion 3212 and the first emission part 321b. The cross section of the first straight portion 3213 perpendicular to the traveling direction of the first propagation light has a constant area and shape regardless of the distance from the first emission part 321b. The cross sections of the first tapered portion 3212 and the first straight portion 3213 perpendicular to the traveling direction of the first propagation light have the same shape at the border between the first tapered portion 3212 and the first straight portion 3213.

The second propagation part 322 has: a second incidence end face 322a on which another part of the incident light is incident; a second emission part 322b that emits second propagation light which is light having been incident on the second incidence end face 322a and propagated through the second propagation part 322; first and second side surfaces; a top surface; and a bottom surface. The second incidence end face 322a constitutes another part of the incidence part 32a of the core 32. Both the second incidence end face 322a and the second emission part 322b are rectangular in shape, for example. The first and second side surfaces may be perpendicular to the element-forming surface 11c or oblique to the direction perpendicular to the element-forming surface 11c. In the second propagation part 322, the second propagation light travels in the direction in which the second propagation part 322 extends, i.e., in the −X direction.

The second propagation part 322 includes a second introducing portion 3221, a second tapered portion 3222, and a second straight portion 3223. In FIG. 1, the borders between these portions are shown by dotted lines. The second introducing portion 3221, the second tapered portion 3222, and the second straight portion 3223 are of identical shape with the first introducing portion 3211, the first tapered portion 3212, and the first straight portion 3213, respectively.

Here, as shown in FIG. 2, the width of the first and second introducing portions 3211 and 3221 in the Y direction will be symbolized by $W_{WGA}$. $W_{WGA}$ preferably falls within the range of 0.3 to 6 μm, and more preferably within the range of 1 to 5 μm. As shown in FIG. 3, the thickness of the first and second introducing portions 3211 and 3221 in the Z direction will be symbolized by $T_{WGA}$. $T_{WGA}$ preferably falls within the range of 0.25 to 0.95 μm, and more preferably within the range of 0.35 to 0.8 μm. Additionally, as shown in FIG. 2, the length of the first and second introducing portions 3211 and 3221 in the X direction will be symbolized by $H_{WGA}$. $H_{WGA}$ falls within the range of 0 to 200 μm, for example. Zero $H_{WGA}$ means that neither of the first and second introducing portions 3211 and 3221 is present and the respective end faces of the first and second tapered portions 3212 and 3222 are thus located in the rear surface 12b. In this case, the first and second incidence end faces 321a and 322a are composed of the respective end faces of the first and second tapered portions 3212 and 3222.

As shown in FIG. 3, the thickness of the first and second tapered portions 3212 and 3222 in the Z direction will be symbolized by $T_{WGB}$. $T_{WGB}$ preferably falls within the range of 0.25 to 0.95 μm, and more preferably within the range of 0.35 to 0.8 μm. Additionally, as shown in FIG. 2, the length of the first and second tapered portions 3212 and 3222 in the X direction will be symbolized by $H_{WGB}$. $H_{WGB}$ falls within the range of 10 to 200 μm, for example.

As shown in FIG. 2, the width of the first and second straight portions 3213 and 3223 in the Y direction will be symbolized by $W_{WGC}$. As shown in FIG. 3, the thickness of the first and second straight portions 3213 and 3223 in the Z direction will be symbolized by $T_{WGC}$. In the embodiment, the first straight portion 3213 propagates the first propagation light in single mode, and the second straight portion 3223 propagates the second propagation light in single mode. To achieve this, $W_{WGC}$ preferably falls within the range of 0.3 to 1 μm, and more preferably within the range of 0.35 to 0.6 μm. $T_{WGC}$ preferably falls within the range of 0.25 to 0.95 μm, and more preferably within the range of 0.35 to 0.8 μm. As shown in FIG. 2, the length of the first and second straight portions 3213 and 3223 in the X direction will be symbolized by $H_{WGC}$. $H_{WGC}$ falls within the range of 10 to 100 μm, for example.

As shown in FIG. 3, the distance between the first propagation part 321 and the second propagation part 322 is constant regardless of the distance from the rear surface 12b. This distance will hereinafter be symbolized by $D_{WG}$. The distance between the first incidence end face 321a and the second incidence end face 322a constituting the incidence part 32a of the core 32 is equal to $D_{WG}$. It is preferred that $D_{WG}$ have such a size that the incident light impinges on both the first incidence end face 321a and the second incidence end face 322a. Specifically, $D_{WG}$ is preferably 1.7 μm or smaller, and more preferably 1.3 μm or smaller.

Smaller $D_{WG}$ results in an interaction between the first propagation light which propagates through the first propagation part 321 and the second propagation light which propagates through the second propagation part 322. Specifically, smaller $D_{WG}$ allows transfer of light energy between the first propagation part 321 and the second propagation part 322. An increase in the amount of energy transfer can disturb the energy balance between the first and second propagation light in the first and second emission parts 321b and 322b. It is therefore preferred that $D_{WG}$ have some size so as not to increase the aforementioned interaction. Here, the wavelength of the first and second propagation light will be symbolized by λ. The refractive index of the clad (clad layer 33) lying between the first propagation part 321 and the second propagation part 322 will be symbolized by $n_{CL}$. It is preferred that $D_{WG}$ be equal to or greater than $\lambda/(2 \cdot n_{CL})$, and more preferably equal to or greater than $\lambda/n_{CL}$.

$D_{WG}$ is determined in consideration of not only λ and $n_{CL}$ mentioned above but also the spot diameter of the incident light, and the dimensions and arrangement of the first and second incidence end faces 321a and 322a. The relationship between such parameters will be detailed later.

The coupling part 324 is in the shape of a rectangular solid, for example. The outer periphery of the coupling part 324 includes a first portion 324a facing toward the first and second propagation parts 321 and 322, a second portion 324b facing toward the third propagation part 323, a top surface, a bottom surface, and two side surfaces. The two side surfaces of the coupling part 324 may be perpendicular to the element-forming surface 11c, or may include portions that are oblique to the direction perpendicular to the element-forming surface 11c. The first emission part 321b of the first propagation part 321 and the second emission part 322b of the second propagation part 322 are coupled to the first portion 324a. The first emission part 321b is coupled to the upper area of the first portion 324a above the center in the vertical direction (the Z direction). The second emission part 322b is coupled to the lower area of the first portion 324a below the center in the vertical direction (the Z direction). The third propagation part 323 is coupled to the second portion 324b.

As shown in FIG. 5, the first portion 324a includes a first incidence part 324a1 on which the first propagation light emitted from the first emission part 321b is incident, and a second incidence part 324a2 on which the second propagation light emitted from the second emission part 322b is incident. The first incidence part 324a1 is composed of the area of the first portion 324a to which the first emission part 321b is coupled. The second incidence part 324a2 is composed of the area of the first portion 324a to which the second emission part 322b is coupled.

As will be described in detail later, third propagation light is generated in the coupling part 324 based on the first propagation light and the second propagation light. The second portion 324b includes a third emission part 324b1 that emits the third propagation light. The third emission part 324b1 is composed of the area of the second portion 324b to which the third propagation part 323 is coupled.

Here, as shown in FIG. 2, the width of the coupling part 324 in the Y direction will be symbolized by $W_{WG4}$. $W_{WG4}$ preferably falls within the range of 0.3 to 1 µm, and more preferably within the range of 0.35 to 0.6 µm. As shown in FIG. 5, the thickness of the coupling part 324 in the Z direction will be symbolized by $T_{WG4}$. $T_{WG4}$ preferably falls within the range of 0.8 to 2.2 µm, and more preferably within the range of 1.0 to 2.0 µm.

As shown in FIG. 5, the length of the coupling part 324 in the X direction will be symbolized by $H_{WG4}$. $H_{WG4}$ is a parameter for allowing the third propagation light to be incident on the third propagation part 323. $H_{WG4}$ will be described in more detail later.

The third propagation part 323 includes: a third incidence part 323a on which the third propagation light emitted from the third emission part 324b1 is incident; a front end face 323b opposite to the third incidence part 323a; an evanescent light generating surface 323c which is a top surface; a bottom surface 323d; and two side surfaces 323e and 323f. The front end face 323b also serves as the front end face of the core 32. The third incidence part 323a is coupled to the center area of the second portion 324b of the coupling part 324 in the vertical direction (the Z direction). Both the third incidence part 323a and the front end face 323b are rectangular in shape, for example. The side surfaces 323e and 323f may be perpendicular to the element-forming surface 11c or oblique to the direction perpendicular to the element-forming surface 11c. In the third propagation part 323, the third propagation light travels in the direction in which the third propagation part 323 extends, i.e., in the −X direction. The evanescent light generating surface 323c generates evanescent light based on the third propagation light.

The cross section of the third propagation part 323 perpendicular to the traveling direction of the third propagation light (the −X direction) is rectangular in shape, for example. The aforementioned cross section of the third propagation part 323 has an area smaller than the total sum of the areas of the first incidence end face 321a and the second incidence end face 322a. In the example shown in FIG. 1 to FIG. 3, the aforementioned cross section of the third propagation part 323 has a constant area and shape regardless of the distance from the coupling part 324.

Here, as shown in FIG. 2, the width of the third propagation part 323 in the Y direction will be symbolized by $W_{WG3}$. As shown in FIG. 3, the thickness of the third propagation part 323 in the Z direction will be symbolized by $T_{WG3}$. In the embodiment, the third propagation part 323 propagates the third propagation light in single mode. To achieve this, $W_{WG3}$ preferably falls within the range of 0.25 to 1 µm, and more preferably within the range of 0.35 to 0.6 µm. $T_{WG3}$ preferably falls within the range of 0.3 to 1 µm, and more preferably within the range of 0.35 to 0.6 µm. $T_{WG3}$ may be equal to, or smaller or greater than the distance $D_{WG}$ between the first propagation part 321 and the second propagation part 322. Here, the dimension of the incidence part 32a in the Z direction will be defined as the distance from the top end of the first incidence end face 321a to the bottom end of the second incidence end face 322a. $T_{WG3}$ is smaller than the dimension of the incidence part 32a in the Z direction.

As shown in FIG. 2, the length of the third propagation part 323 in the X direction will be symbolized by $H_{WG3}$. $H_{WG3}$ falls within the range of 10 to 100 µm, for example.

Figure 6:
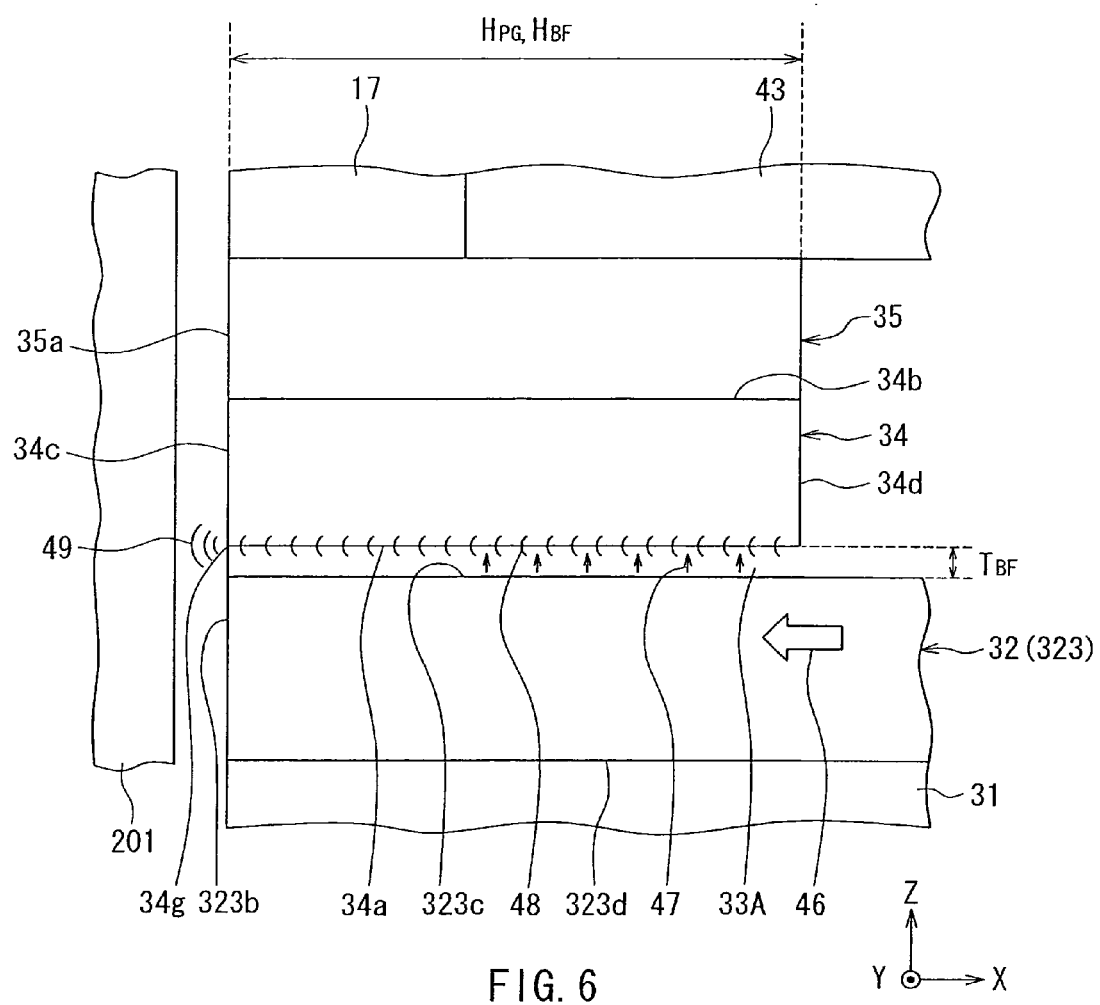
FIG. 6 is a cross-sectional view showing the core, a plasmon generator, and a magnetic pole of a thermally-assisted magnetic recording head according to the embodiment of the invention.

Reference is now made to FIG. 6 to describe an example of configurations and arrangement of the plasmon generator 34 and the magnetic pole 35. FIG. 6 is a cross-sectional view showing the core 32 (the third propagation part 323), the plasmon generator 34, and the magnetic pole 35.

In the example shown in FIG. 6, the plasmon generator 34 has a near-field light generating edge 34g located in the medium facing surface 12a. The plasmon generator 34 is in the shape of a triangular prism having an outer surface as described below. The outer surface of the plasmon generator 34 includes a propagative edge 34a, a top surface 34b, and first and second inclined surfaces (not shown). The propagative edge 34a faces the evanescent light generating surface 323c with a predetermined distance therefrom, and extends in the direction perpendicular to the medium facing surface 12a. As will be described later, the propagative edge 34a propagates plasmons. The near-field light generating edge 34g lies at an end of the propagative edge 34a. Although not shown, each of the first and second inclined surfaces is connected to the propagative edge 34a, and the distance between the first and second inclined surfaces increases with increasing distance from the propagative edge 34a. The top surface 34b connects the respective top ends of the first and second inclined surfaces to each other. For example, an angle of 30 to 120 degrees is formed between the first and second inclined surfaces.

The outer surface of the plasmon generator 34 further includes a front end face 34c located in the medium facing surface 12a, and a rear end face 34d opposite to the front end face 34c. Each of the front end face 34c and the rear end face 34d connects the first inclined surface, the second inclined surface, and the top surface 34b to each other. The front end face 34c is triangular in shape, for example. One of the vertexes of the front end face 34c lies at an end of the propagative edge 34a. This vertex constitutes the near-field light generating edge 34g.

In the example shown in FIG. 6, the distance between the propagative edge 34a and the top surface 34b is constant or almost constant regardless of the distance from the medium facing surface 12a. The width of the top surface 34b in the Y direction is constant or almost constant regardless of the distance from the medium facing surface 12a.

As shown in FIG. 6, the part of the clad layer 33 interposed between the evanescent light generating surface 323c and the propagative edge 34a forms a buffer part 33A having a refractive index lower than that of the core 32.

In the example shown in FIG. 6, the magnetic pole 35 is disposed at such a position that the plasmon generator 34 is interposed between the magnetic pole 35 and the third propagation part 323. The magnetic pole 35 has an end face 35a located in the medium facing surface 12a. The end face 35a is rectangular in shape, for example. The bottom surface of the magnetic pole 35 is in contact with the top surface 34b of the plasmon generator 34.

The dimension of the plasmon generator 34 in the track width direction TW (the Y direction) at the medium facing surface 12a and the dimension of the plasmon generator 34 in the Z direction at the medium facing surface 12a are both sufficiently smaller than the wavelength of the laser light propagating through the core 32. Both of these dimensions fall within the range of 10 to 100 nm, for example. As shown in FIG. 6, the length of the plasmon generator 34 in the X direction will be symbolized by $H_{PG}$. $H_{PG}$ falls within the range of 0.6 to 4.0 µm, for example.

As shown in FIG. 6, the X-direction length of a portion of the propagative edge 34a of the plasmon generator 34, the portion facing the evanescent light generating surface 323c, will be symbolized by $H_{BF}$. As shown in FIG. 6, the distance between the propagative edge 34a and the evanescent light generating surface 323c will be symbolized by $T_{BF}$. Both $H_{BF}$ and $T_{BF}$ are important parameters in achieving appropriate excitation and propagation of surface plasmons. $H_{BF}$ preferably falls within the range of 0.6 to 4.0 µm, and is preferably greater than the wavelength of the laser light propagating through the core 32. In the example shown in FIG. 6, the front end face 323b of the third propagation part 323 is exposed in the medium facing surface 12a, so that $H_{BF}$ is equal to $H_{PG}$. $T_{BF}$ preferably falls within the range of 10 to 100 nm. The distance between the near-field light generating edge 34g of the plasmon generator 34 and the front end face 323b of the third propagation part 323 is equal to $T_{BF}$.

The configurations and arrangement of the plasmon generator 34 and the magnetic pole 35 are not limited to the foregoing example described with reference to FIG. 6.

The light propagating through the core 32 will now be described with reference to FIG. 3, FIG. 5, and FIG. 10. The incident light 44 to be incident on the incidence part 32a of the core 32 is emitted from the emission center 62a of the laser diode 60.

The incident light 44 is divergent light. The incident light 44 has its center 44C parallel to the element-forming surface 11c. The previously-mentioned imaginary plane P (see FIG. 2 and FIG. 4) includes the center 44C. As typically defined, the beam shape of the incident light 44 is defined as its shape in the plane in which its radiation intensity is $1/e^2$ that at the center 44C. As the distance from the emission center 62a increases, the beam shape of the incident light 44 gradually approximates a circular cone or elliptic cone whose vertex falls on a point on an imaginary straight line including the center 44C in the vicinity of the emission center 62a. Here, the angle which a side of the aforementioned circular cone or elliptic cone forms with the center 44C will be referred to as the angle of divergence. The angle of divergence in an imaginary plane that contains the center 44C and is parallel to the element-forming surface 11c (hereinafter referred to as the horizontal angle of divergence) may be equal to or different from the angle of divergence in the imaginary plane P which contains the center 44C and is perpendicular to the element-forming surface 11c (hereinafter referred to as the vertical angle of divergence).

In the embodiment, the laser diode 60 has a multilayer structure having layers stacked in the Z direction (see FIG. 10). As viewed in cross section perpendicular to the X direction, the emission light from the laser diode 60 is oblong in the Y direction immediately after emission, and then spreads out rapidly in the Z direction. The vertical angle of divergence of the incident light 44 therefore tends to be greater than the horizontal angle of divergence, and the spot shape of the incident light 44 when incident on the incident part 32a tends to be oblong in the Z direction. The horizontal angle of divergence falls within the range of 6 to 20 degrees, for example, while the vertical angle of divergence falls within the range of 20 to 60 degrees, for example.

The incidence part 32a is composed of the first incidence end face 321a of the first propagation part 321 and the second incidence end face 322a of the second propagation part 322. The incident light 44 is incident on across the first incidence end face 321a and the second incidence end face 322a.

When the incident light 44 is incident on the incidence part 32a, the spot diameter (the diameter of the radiation intensity contour where the radiation intensity falls to $1/e^2$ that at the spot center) of the incident light 44 needs to be at least such a size that the incident light 44 impinges on both the first incidence end face 321a and the second incidence end face 322a. On the other hand, if the spot diameter of the incident light 44 is excessively large, the proportion of the incident light 44 that impinges on areas other than the incidence part 32a (the first and second incidence end faces 321a and 322a) increases and the amount of the incident light 44 incident on the core 32 thus decreases. Under the circumstances, the spot diameter of the incident light 44 has a preferred range. The range is determined by the dimensions of the incidence part 32a, and more specifically, the dimensions and arrangement of the first and second incidence end faces 321a and 322a. It should be noted that the dimensions of the first and second incidence end faces 321a and 322a in the Y direction are equal to $W_{WGA}$ shown in FIG. 2. The dimensions of the first and second incidence end faces 321a and 322a in the Z direction are equal to $T_{WGA}$ shown in FIG. 3. The distance between the first incidence end face 321a and the second incidence end face 322a is equal to $D_{WG}$ shown in FIG. 3 and FIG. 4. Hereinafter, the dimensions and arrangement of the first and second incidence end faces 321a and 322a will be described in terms of $W_{WGA}$, $T_{WGA}$, and $D_{WG}$.

First, the size (diameter) of the spot of the incident light 44 in the Y direction when incident on the incidence part 32a will be defined as the spot diameter of the incident light 44 in the Y direction. The size (diameter) of the spot of the incident light 44 in the Z direction when incident on the incidence part 32a will be defined as the spot diameter of the incident light 44 in the Z direction.

The dimension of the incidence part 32a in the Y direction is equal to the dimension $W_{WGA}$ of the first and second incidence end faces 321a and 322a in the Y direction. The proportion of the dimension $W_{WGA}$ of the incidence part 32a in the Y direction to the spot diameter of the incident light 44 in the Y direction preferably falls within the range of 0.4 to 1.6, and more preferably within the range of 0.6 to 1.4.

The dimension of the incidence part 32a in the Z direction defined previously is expressed as $2T_{WGA}+D_{WG}$. The proportion of the dimension of the incidence part 32a in the Z direction ($2T_{WGA}+D_{WG}$) to the spot diameter of the incident light 44 in the Z direction preferably falls within the range of 0.55 to 1.6, and more preferably within the range of 0.6 to 1.4.

The operation of the optical waveguide according to the embodiment will now be described. Part of the incident light 44 is incident on the first incidence end face 321a of the first propagation part 321, and propagates through the first propagation part 321 as the first propagation light 451. Another part of the incident light 44 is incident on the second incidence end face 322a of the second propagation part 322, and propagates through the second propagation part 322 as the second propagation light 452. The first propagation light 451 decreases in diameter as it propagates through the first tapered portion 3212. Similarly, the second propagation light 452 decreases in diameter as it propagates through the second tapered portion 3222.

The first propagation light 451 having propagated through the first propagation part 321 is emitted from the first emission part 321b and incident on the first incidence part 324a1 of the coupling part 324. The second propagation light 452 having propagated through the second propagation part 322 is emitted from the second emission part 322b and incident on the second incidence part 324a2 of the coupling part 324. The first propagation part 321 and the second propagation part 322 are of identical shape, and both the first and second straight portions 3213 and 3223 propagate the propagation light in single mode. The first propagation light 451 in the first incidence part 324a1 and the second propagation light 452 in the second incidence part 324a2 therefore have the same or almost the same phases.

First light waves 453 resulting from the first propagation light 451 incident on the first incidence part 324a1 and second light waves 454 resulting from the second propagation light 452 incident on the second incidence part 324a2 occur in the coupling part 324.

For example, the first light waves 453 occur from interference of a plurality of light waves that each result from the first propagation light 451 incident on the first incidence part 324a1 and that are different from each other in the number of times of reflection (including zero times) by the outer periphery of the coupling part 324 (excluding the first and second incidence parts 324a1 and 324a2 and the third emission part 324b1).

Reference is now made to FIG. 5 to describe an example of modes of the first light waves 453 in detail. In FIG. 5, the reference symbol 453a designates light waves that result from the first propagation light 451 and are reflected zero times, while the reference symbol 453b designates light waves that result from the first propagation light 451 and are reflected twice. The broken line with the reference symbol 453a1 represents the path of the light waves 453a, while the broken line with the reference symbol 453b1 represents the path of the light waves 453b. As shown in FIG. 5, the light waves 453a travel directly toward the third emission part 324b1 without being reflected by the outer periphery of the coupling part 324. The light wave 453b are reflected twice by the second portion 324b (excluding the third emission part 324b1) and the first portion 324a (excluding the first and second incidence parts 324a1 and 324a2) and travel to the third emission part 324b1. The light waves 453a and the light waves 453b reflected by the first portion 324a interfere with each other. The first light waves 453 include light waves that occur from the interference of the light waves 453a and the light waves 453b, for example. The solid lines in the coupling part 324 shown in FIG. 5 show portions where a plurality of light waves such as the aforementioned light waves 453a and 453b interfere with and enhance each other (bright lines).

Like the first light waves 453, the second light waves 454 occur from, for example, interference of a plurality of light waves that each result from the second propagation light 452 incident on the second incidence part 324a2 and that are different from each other in the number of times of reflection (including zero times) by the outer periphery of the coupling part 324 (excluding the first and second incidence parts 324a1 and 324a2 and the third emission part 324b1). The principle of occurrence of the second light waves 454 is the same as that of the first light waves 453. In FIG. 5, the reference symbol 454a designates light waves that result from the second propagation light 452 and are reflected zero times, while the reference symbol 454b designates light waves that result from the second propagation light 452 and are reflected twice. The broken line with the reference symbol 454a1 represents the path of the light waves 454a, while the broken line with the reference symbol 454b1 represents the path of the light waves 454b.

In the coupling part 324, the first light waves 453 and the second light waves 454 interfere with each other to generate third propagation light 46. In particular, it is preferred that the third propagation light 46 be enhanced light resulting from the interference of the first light waves 453 and the second light waves 454. The third propagation light 46 is emitted from the third emission part 324b1, is incident on the third incidence part 323a of the third propagation part 323 and propagates through the third propagation part 323.

The length $H_{WG4}$ of the coupling part 324 in the X direction is set so that the third propagation light 46 emitted from the third emission part 324b1 has high intensity. Specifically, for example, the length $H_{WG4}$ is set so that the third emission part 324b1 lies in or near the position where a bright line of the first light waves 453 and a bright line of the second light waves 454 intersect each other. It should be noted that the positions of the bright lines of the light waves 453 and 454 vary with the length $H_{WG4}$. The length $H_{WG4}$ may be set on the basis of a simulation or experiment. For example, with a value at which the third propagation light 46 peaks in intensity centered, the length $H_{WG4}$ is set within such a range of values that the amount of decrease in intensity of the third propagation light 46 with respect to the peak intensity falls within acceptable levels.

A specific example of $H_{WG4}$ will be given. Suppose that the incident light 44 (the first and second propagation light 451 and 452) has a wavelength of 800 nm, the core 32 (the coupling part 324) has a refractive index of 2.08, and the clad (the clad layers 31 and 33) has a refractive index of 1.67. In such a case, $H_{WG4}$ at which the third propagation light 46 peaks in intensity is 2.4 μm, 7.2 or 12.0 μm, for example.

Reference is now made to FIG. 6 to describe the principle of generation of near-field light in the embodiment and the principle of thermally-assisted magnetic recording using the near-field light. The third propagation light 46 propagates through the third propagation part 323 and reaches the vicinity of the buffer part 33A. Here, the third propagation light 46 is totally reflected at the interface between the third propagation part 323 and the buffer part 33A. This generates evanescent light 47 permeating into the buffer part 33A. Then, the evanescent light 47 and fluctuations of charges on at least the propagative edge 34a of the outer surface of the plasmon generator 34 are coupled with each other to induce a surface plasmon polariton mode. In this way, surface plasmons 48 are excited at least on the propagative edge 34a through coupling with the evanescent light 47 generated from the evanescent light generating surface 323c. Here, the third propagation light 46 may be polarized light of TM mode. In this case, the electric field of the third propagation light 46 oscillates perpendicularly to the evanescent light generating surface 323c facing the propagative edge 34a. This allows the plasmon generator 34 to generate surface plasmons of high intensity.

The surface plasmons 48 excited at least on the propagative edge 34a of the outer surface of the plasmon generator 34 are transformed into edge plasmons to propagate along the propagative edge 34a to the near-field light generating edge 34g. Consequently, the edge plasmons concentrate at the near-field light generating edge 34g, and near-field light 49 occurs from the near-field light generating edge 34g based on the edge plasmons. The near-field light 49 is projected toward the magnetic disk 201, reaches the surface of the magnetic disk 201 and heats a part of the magnetic recording layer of the magnetic disk 201. This lowers the coercivity of the part of the magnetic recording layer. In thermally-assisted magnetic recording, the part of the magnetic recording layer with the lowered coercivity is subjected to a write magnetic field produced by the magnetic pole 35 for data writing.

Figure 12:
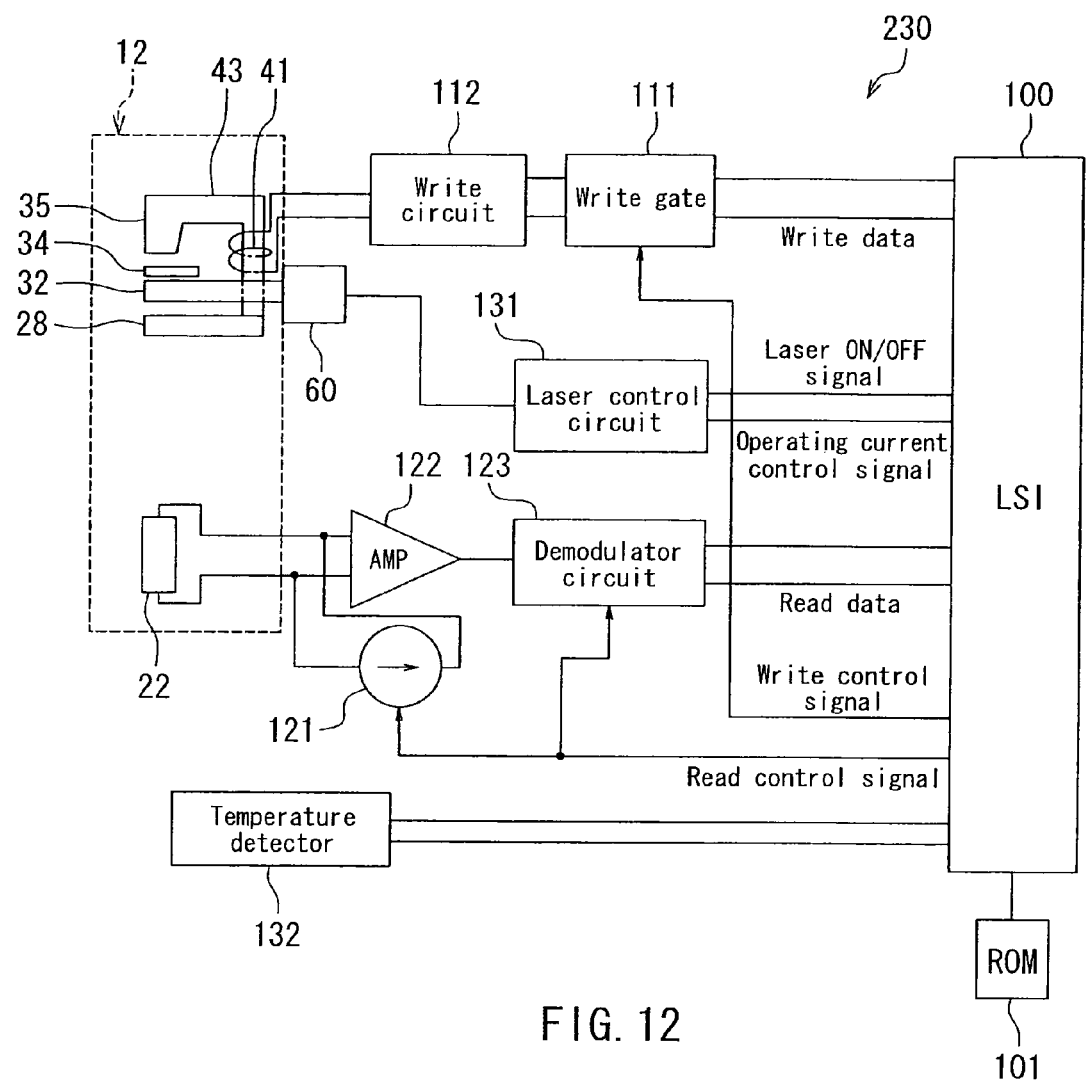
FIG. 12 is a block diagram showing the circuit configuration of the magnetic recording device according to the embodiment of the invention.

Reference is now made to FIG. 12 to describe the circuit configuration of the control circuit 230 shown in FIG. 7 and the operation of the thermally-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 41.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies write data and a write control signal to the write gate 111. The control LSI 100 supplies a read control signal to the constant current circuit 121 and the demodulator circuit 123, and receives read data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a write operation, the control LSI 100 supplies write data to the write gate 111. The write gate 111 supplies the write data to the write circuit 112 only when the write control signal indicates a write operation. According to the write data, the write circuit 112 passes a write current through the coil 41. Consequently, the magnetic pole 35 produces a write magnetic field and data is written on the magnetic recording layer of the magnetic disk 201 through the use of the write magnetic field.

In a read operation, the constant current circuit 121 supplies a certain sense current to the MR element 22 only when the read control signal indicates a read operation. The output voltage of the MR element 22 is amplified by the amplifier 122 and input to the demodulator circuit 123. When the read control signal indicates a read operation, the demodulator circuit 123 demodulates the output of the amplifier 122 to generate read data, and supplies the read data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light propagates through the core 32. Then, according to the principle of generation of near-field light described previously, the near-field light 49 occurs from the near-field light generating edge 34g of the plasmon generator 34. The near-field light 49 heats a part of the magnetic recording layer of the magnetic disk 201, thereby lowering the coercivity of that part. When writing, the part of the magnetic recording layer with the lowered coercivity is subjected to the write magnetic field produced by the magnetic pole 35 for data writing.

On the basis of such factors as the temperature of the magnetic recording layer of the magnetic disk 201 measured by the temperature detector 132, the control LSI 100 consults the control table stored in the ROM 101 to determine the value of the operating current of the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 49, and data that indicates the temperature dependence of the coercivity of the magnetic recording layer.

As shown in FIG. 12, the control circuit 230 has the signal system for controlling the laser diode 60, i.e., the signal system consisting of the laser ON/OFF signal and the operating current control signal, independent of the control signal system intended for read/write operations. This configuration makes it possible to implement various modes of energization of the laser diode 60, not only to energize the laser diode 60 simply in association with a write operation. It should be noted that the control circuit 230 may have any other configuration than the configuration shown in FIG. 12.

A method of manufacturing the slider 10 of the embodiment will now be described briefly. The method of manufacturing the slider 10 includes the steps of: forming components of a plurality of sliders 10 other than the slider substrates 11 on a substrate that includes portions to become the slider substrates 11 of the plurality of sliders 10, thereby fabricating a substructure including a plurality of rows of pre-slider portions that are to become the sliders 10 later; and forming the sliders 10 by cutting the substructure to separate the pre-slider portions from each other. In the step of forming the sliders 10, the cut surfaces are polished into the medium facing surfaces 11a and 12a.

Figure 13:
FIG. 13 is a perspective view showing a step of a method of manufacturing the optical wave guide according to the embodiment of the invention.
Figure 13:
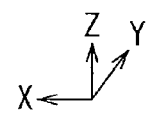

Next, a method of manufacturing the optical waveguide according to the embodiment will be described with reference to FIG. 13 to FIG. 21. FIG. 13 to FIG. 21 are perspective views each showing part of the stack formed in the process of manufacturing the optical waveguide. The method of manufacturing the optical waveguide according to the embodiment includes the step of forming the core 32 and the step of forming the clad. The step of forming the clad includes the steps of forming the clad layer 31 and forming the clad layer 33. In the method of manufacturing the optical waveguide according to the embodiment, first, a clad material layer 311 is formed as shown in FIG. 13. The clad material layer 311 is made of a dielectric material that is to be employed for the clad layer 31.

Figure 14:
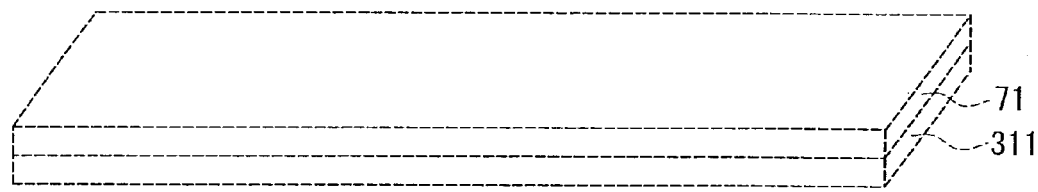
FIG. 14 is a perspective view showing a step that follows the step shown in FIG. 13.
Figure 14:
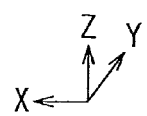

FIG. 14 shows the next step. In this step, a core material layer 71 made of a dielectric material is formed on the clad material layer 311. The core material layer 71 is to become part of the core 32 later.

Figure 15:
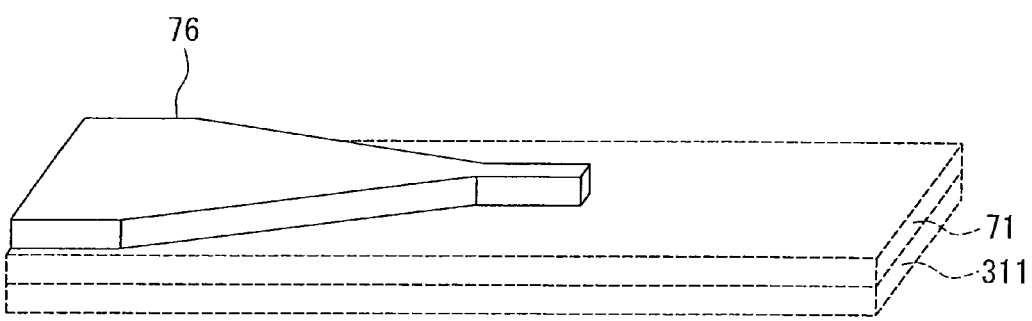
FIG. 15 is a perspective view showing a step that follows the step shown in FIG. 14.
Figure 15:
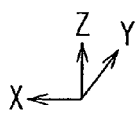

FIG. 15 shows the next step. In this step, a photoresist mask 76, whose planar shape (shape as viewed from above) corresponds to the planar shape of the second propagation part 322 and the coupling part 324, is formed on the core material layer 71. The photoresist mask 76 is formed by patterning a photoresist layer by photolithography.

Figure 16:
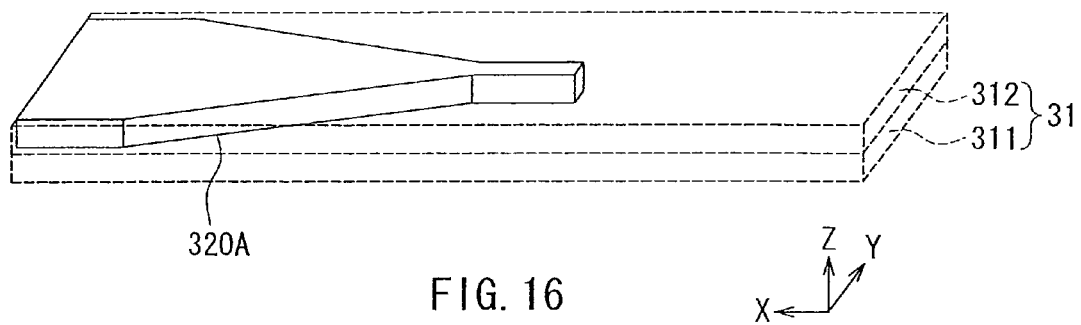
FIG. 16 is a perspective view showing a step that follows the step shown in FIG. 15.

FIG. 16 shows the next step. In this step, first, part of the core material layer 71 not covered with the photoresist mask 76 is removed by etching such as ion milling. This makes the core material layer 71 into a first portion 320A which constitutes part of the core 32. The first portion 320A includes the second propagation part 322 and a portion of the coupling part 324. The photoresist mask 76 is then removed. Next, a clad material layer 312 is formed over the entire top surface of the stack. The clad material layer 312 is made of the dielectric material to be employed for the clad layer 31. Next, the clad material layer 312 is polished by, for example, chemical mechanical polishing (hereinafter referred to as CMP), until the top surface of the first portion 320A is exposed. The top surfaces of the first portion 320A and the clad material layer 312 are thereby made even with each other. The clad material layers 311 and 312 constitute the clad layer 31.

Figure 17:
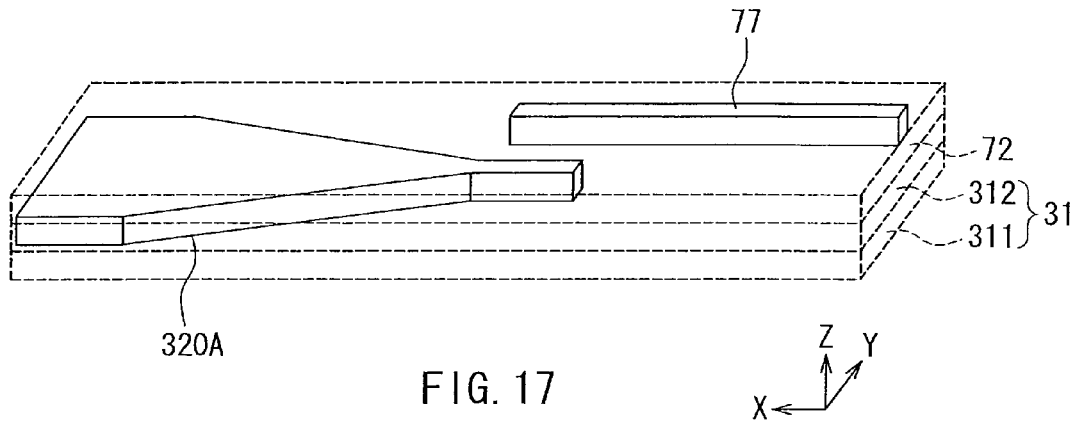
FIG. 17 is a perspective view showing a step that follows the step shown in FIG. 16.

FIG. 17 shows the next step. In this step, first, a core material layer 72 is formed over the entire top surface of the stack. The core material layer 72 is made of a dielectric material, and is to later become another part of the core 32. Next, a photoresist mask 77, whose planar shape corresponds to the planar shape of the third propagation part 323 and the coupling part 324, is formed on the core material layer 72. The photoresist mask 77 is formed by patterning a photoresist layer by photolithography.

Figure 18:
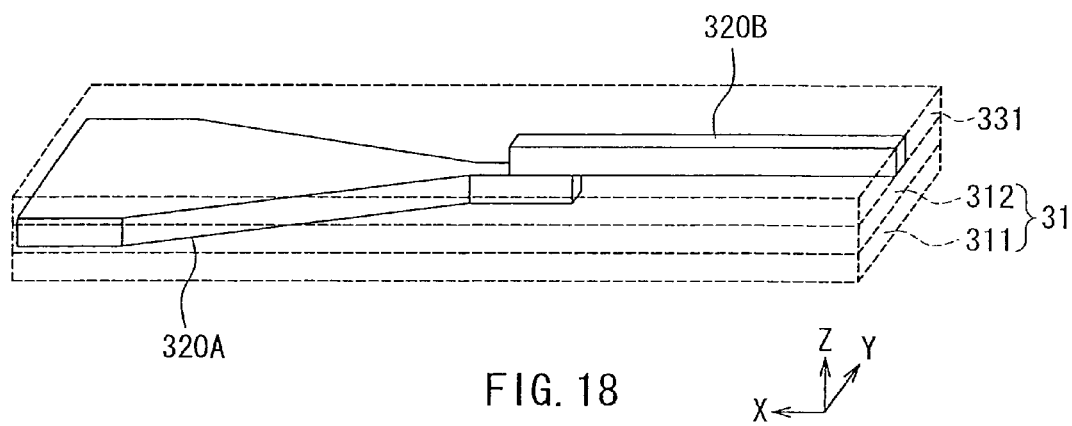
FIG. 18 is a perspective view showing a step that follows the step shown in FIG. 17.

FIG. 18 shows the next step. In this step, first, part of the core material layer 72 not covered with the photoresist mask 77 is removed by etching such as ion milling. This makes the core material layer 72 into a second portion 320B which constitutes another part of the core 32. The second portion 320B includes the third propagation part 323 and another portion of the coupling part 324. The photoresist mask 77 is then removed. Next, a clad material layer 331 is formed over the entire top surface of the stack. The clad material layer 331 is made of a dielectric material that is to be employed for the clad layer 33. Next, the clad material layer 331 is polished by, for example, CMP, until the top surface of the second portion 320B is exposed. The top surfaces of the second portion 320B and the clad material layer 331 are thereby made even with each other.

Figure 19:
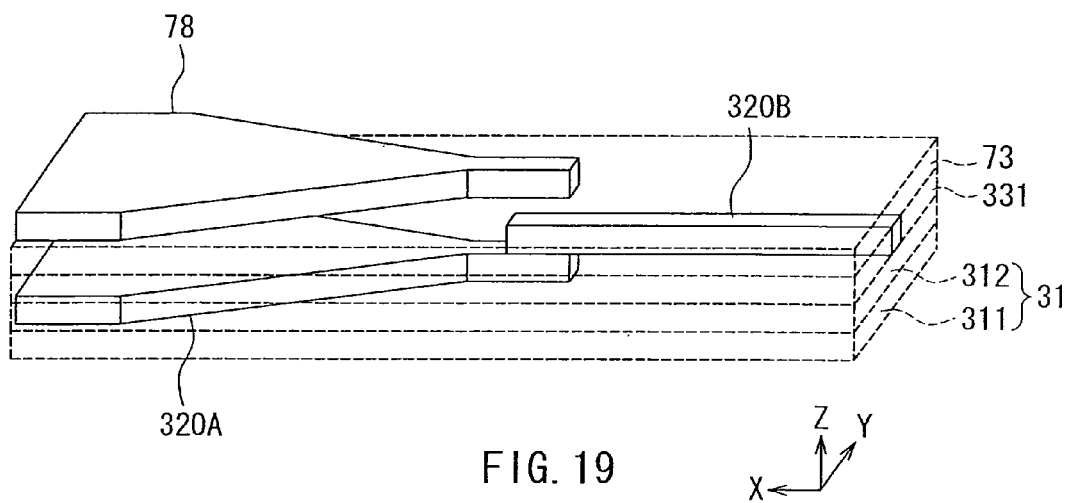
FIG. 19 is a perspective view showing a step that follows the step shown in FIG. 18.

FIG. 19 shows the next step. In this step, first, a core material layer 73 is formed over the entire top surface of the stack. The core material layer 73 is made of a dielectric material, and is to later become still another part of the core 32. Next, a photoresist mask 78, whose planar shape corresponds to the planar shape of the first propagation part 321 and the coupling part 324, is formed on the core material layer 73. The photoresist mask 78 is of the same shape as the photoresist mask 76. The photoresist mask 78 is formed by patterning a photoresist layer by photolithography.

Figure 20:
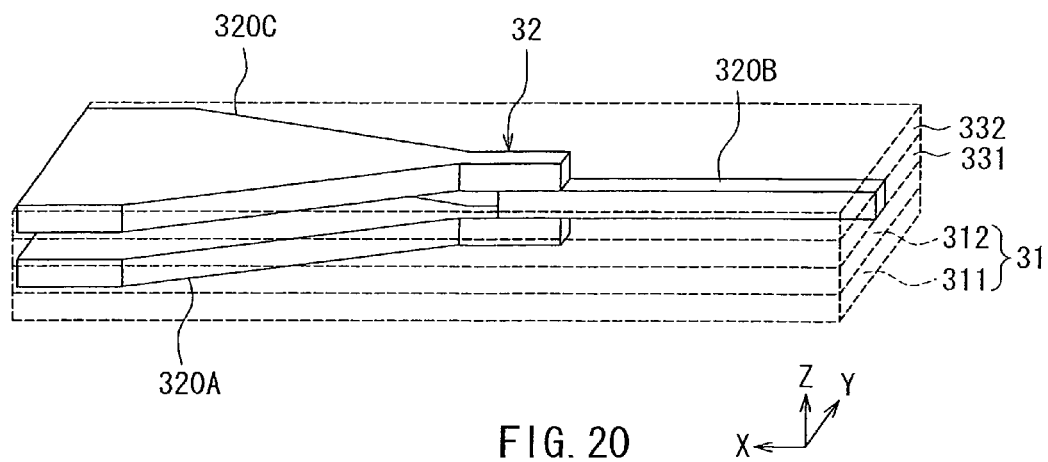
FIG. 20 is a perspective view showing a step that follows the step shown in FIG. 19.

FIG. 20 shows the next step. In this step, first, part of the core material layer 73 not covered with the photoresist mask 78 is removed by etching such as ion milling. This makes the core material layer 73 into a third portion 320C which constitutes still another part of the core 32. The third portion 320C includes the first propagation part 321 and still another portion of the coupling part 324. The first to third portions 320A, 320B, and 320C constitute the core 32. The photoresist mask 78 is then removed. Next, a clad material layer 332 is formed over the entire top surface of the stack. The clad material layer 332 is made of the dielectric material to be employed for the clad layer 33. The clad material layer 332 is then polished by, for example, CMP, until the top surface of the third portion 320C is exposed. The top surfaces of the third portion 320C and the clad material layer 332 are thereby made even with each other.

Figure 21:
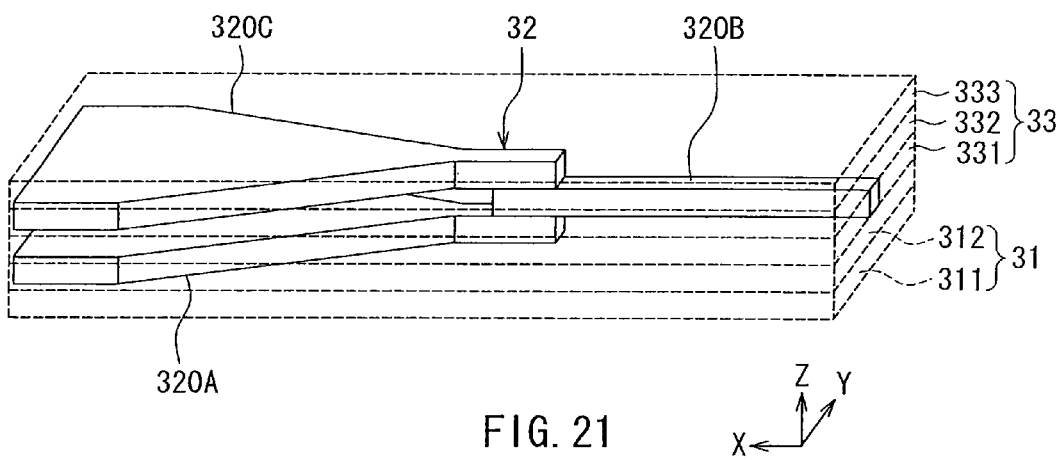
FIG. 21 is a perspective view showing a step that follows the step shown in FIG. 20.

FIG. 21 shows the next step. In this step, a clad material layer 333 is formed over the entire top surface of the stack. The clad material layer 333 is made of the dielectric material to be employed for the clad layer 33. The clad material layers 331, 332, and 333 constitute the clad layer 33.

Next, the effects of the optical waveguide and the thermally-assisted magnetic recording head 1 according to the embodiment will be described. The optical waveguide according to the embodiment allows the incident light 44 which is incident on across the first and second incidence end faces 321a and 322a to be converted into the third propagation light 46 to propagate through a single third propagation part 323. According to the embodiment, it is therefore possible to make the diameter of the third propagation light 46 smaller than that of the incident light 44. In particular, in the embodiment, the cross section of the third propagation part 323 perpendicular to the traveling direction of the third propagation light 46 (the −X direction) has an area smaller than the total sum of the areas of the first incidence end face 321a and the second incidence end face 322a. The thickness $T_{WG3}$ of the third propagation part 323 in the Z direction is smaller than the dimension of the incidence part 32a in the Z direction ($2T_{WGA}+D_{WG}$). Consequently, according to the embodiment, the third propagation light 46 certainly becomes smaller in diameter than the incident light 44. The optical waveguide according to the embodiment thus functions as a spot size converter for making the diameter of the third propagation light 46 smaller than that of the incident light.

The cross section of the first tapered portion 3212 perpendicular to the traveling direction of the first propagation light 451 (the −X direction) decreases in area with decreasing distance to the first emission part 321b. The first propagation light 451 therefore decreases in diameter as it propagates through the first tapered portion 3212. Similarly, the cross section of the second tapered portion 3222 perpendicular to the traveling direction of the second propagation light 452 (the −X direction) decreases in area with decreasing distance to the second emission part 322b. The second propagation light 452 therefore decreases in diameter as it propagates through the second tapered portion 3222. Consequently, according to the embodiment, it is possible to make the diameter of the third propagation light 46 still smaller than that of the first and second propagation light 451 and 452.

Now, consider a case where the core 32 of the embodiment is replaced with an imaginary core that consists only of the third propagation part 323 without the first propagation part 321, the second propagation part 322 and the coupling part 324. For such an imaginary core, the third incidence part 323a of the third propagation part 323 serves as the incidence end face. The incidence end face has an area equal to that of the cross section of the third propagation part 323 perpendicular to the traveling direction of the propagation light (the −X direction). The area of the aforementioned cross section of the third propagation part 323 needs to be made somewhat small so that the propagation light is in single mode. This necessitates the area of the incidence end face to be smaller than the spot size of the incident light. This in turn reduces the tolerance for misalignment of the incident light with respect to the incidence end face. In such a case, the proportion of the incident light that impinges on areas other than the incidence end face increases, and the amount of light to propagate through the core thus decreases.

For the aforementioned imaginary core, the cross section of the third propagation part 323 perpendicular to the traveling direction of the propagation light (the −X direction) may be increased in area in order to increase the tolerance for misalignment of the incident light with respect to the incidence end face and increase the amount of light to propagate through the core. If so configured, however, the light that propagates through the third propagation part 323 tends to enter multi mode. In the thermally-assisted magnetic recording head 1, the multi-mode light propagation in the third propagation part 323 decreases the mode that contributes to the excitation of surface plasmons at the propagative edge 34a of the plasmon generator 34. This makes efficient excitation of surface plasmons on the plasmon generator 34 not possible.

In contrast, according to the core 32 of the embodiment, the first propagation part 321 and the second propagation part 322 are spaced apart from each other in the Z direction. Accordingly, the first incidence end face 321a and the second incidence end face 322a are also spaced apart from each other in the Z direction. The embodiment thus makes it possible to increase the dimension (dimension in the Z direction) of the incidence part 32a of the core 32 without increasing the area of the cross section of the third propagation part 323 perpendicular to the traveling direction of the third propagation light 46. Consequently, according to the embodiment, it is possible to increase the tolerance for misalignment of the incident light 44 with respect to the incidence part 32a and increase the amount of light to propagate through the core 32 as compared with the case of using the aforementioned imaginary core.

In the embodiment, the laser diode 60 has the multilayer structure with layers stacked in the Z direction as mentioned previously. The incident light 44 thus tends to have a vertical angle of divergence greater than the horizontal angle of divergence. Here, the use of the aforementioned imaginary core will be considered for the case where the incident light 44 has a vertical angle of divergence greater than the horizontal angle of divergence. Suppose that the incident light 44 is misaligned with respect to the incidence end face by the same amounts in the Z direction and the Y direction. In this case, the amount of change in the incident angle of the incident light 44 to the incidence end face, resulting from the misalignment of the incident light 44, is greater for the misalignment in the Z direction than for the misalignment in the Y direction. Consequently, the amount of change in the coupling efficiency between the core and the incident light 44, resulting from the misalignment of the incident light 44, is greater for the misalignment in the Z direction than for the misalignment in the Y direction. In such a case, the tolerance for the misalignment of the incident light 44 with respect to the incidence end face in the Z direction is therefore smaller than that for the misalignment in the Y direction.

The alignment between the emission center 62a of the laser diode 60 and the incidence part of the core is more difficult in the Z direction than in the Y direction. The reason is that the alignment in the Z direction involves all the position errors of the plurality of layers that are included in the laser diode 60, the core, and the supporting components.

Under the circumstances, when the laser diode 60 has a multilayer structure with layers stacked in the Z direction, it is desired to increase the tolerance for the misalignment of the incident light 44 with respect to the incidence part of the core in the Z direction in particular. The optical waveguide according to the embodiment has the two incidence end faces 321a and 322a which are spaced apart from each other in the direction in which layers of the laser diode 60 are stacked (the Z direction). Such a configuration can increase the tolerance for the misalignment of the incident light 44 with respect to the incidence part 32a in the Z direction. This point will be described in more detail later with reference to simulation results.

In the embodiment, the thickness of the first tapered portion 3212 in the Z direction is constant regardless of the distance from the first emission part 321b. The width of the first tapered portion 3212 in the Y direction decreases with decreasing distance to the first emission part 321b. The thickness of the second tapered portion 3222 in the Z direction is constant regardless of the distance from the second emission part 322b. The width of the second tapered portion 3222 in the Y direction decreases with decreasing distance to the second emission part 322b. According to the embodiment, it is thus possible to increase the dimension $W_{WGA}$ of the first and second incidence end faces 321a and 322a in the Y direction, i.e., the dimension of the incidence part 32a of the core 32 in the Y direction. Consequently, according to the embodiment, it is possible to increase the tolerance for the misalignment of the incident light 44 with respect to the incidence part 32a in the Y direction.

In the embodiment, the first straight portion 3213 propagates the first propagation light 451 in single mode, and the second straight portion 3223 propagates the second propagation light 452 in single mode. According to the embodiment, the phase of the first propagation light 451 in the first incidence part 324a1 and that of the second propagation light 452 in the second incidence part 324a2 can be easily matched with each other. This facilitates the design of the coupling part 324.

Figure 22:
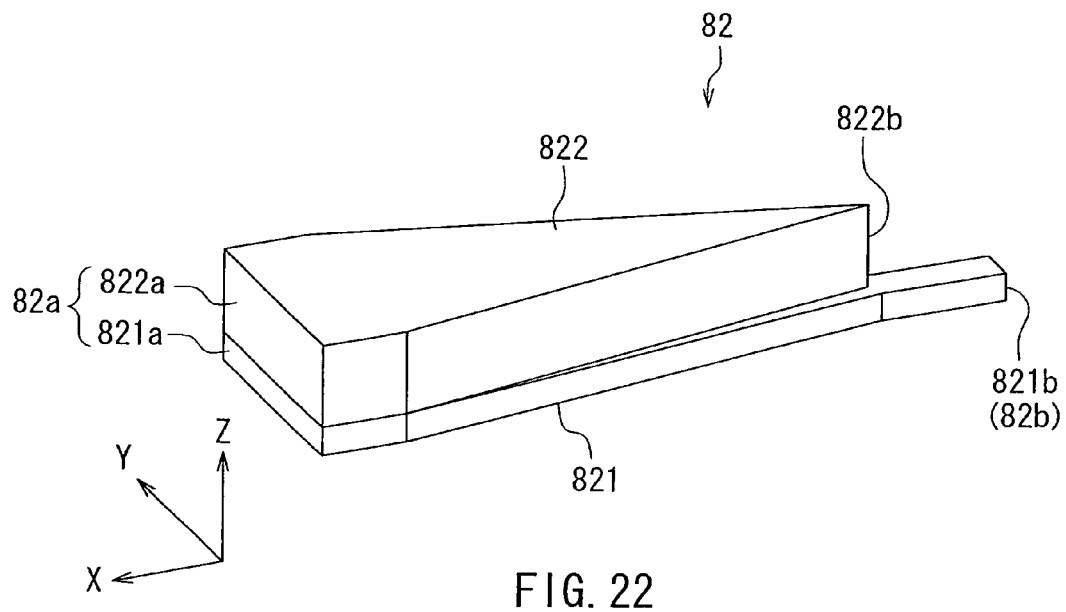
FIG. 22 is a perspective view of a core of an optical waveguide of a comparative example.

Next, the effects of the embodiment will be described in more detail in comparison with an optical waveguide of a comparative example. The optical waveguide of the comparative example is a layered spot size converter. First, the configuration of the optical waveguide of the comparative example will be described with reference to FIG. 22. FIG. 22 is a perspective view of the core of the optical waveguide of the comparative example. The X, Y, and Z directions shown in FIG. 1 to FIG. 5 are also shown in FIG. 22.

The optical waveguide of the comparative example includes the core 82 shown in FIG. 22 and a not-shown clad. The core 82 has an incidence part 82a, and a front end face 82b opposite thereto. The core 82 includes a first propagation part 821, and a second propagation part 822 stacked on the first propagation part 821. The first and second propagation parts 821 and 822 extend in the −X direction in FIG. 22.

The first propagation part 821 has a first incidence end face 821a on which part of the incident light is to be incident, and a front end face 821b opposite to the first incidence end face 821a. The front end face 821b also serves as the front end face 82b of the core 82. The first propagation part 821 is basically of the same shape as the first propagation part 321 of the embodiment shown in FIG. 1 to FIG. 3.

The second propagation part 822 has a second incidence end face 822a on which another part of the incident light is to be incident, and a front end 822b opposite to the second incidence end face 822a. The second propagation part 822 is shaped like a wedge with the front end 822b facing toward the −X direction. The second incidence end face 822a has a rectangular shape. The first and second incidence end faces 821a and 822a collectively form a single surface constituting the incidence part 82a. The light incident on the first and second incidence end faces 821a and 822a travels in the direction in which the first and second propagation parts 821 and 822 extend, i.e., in the −X direction.

The cross section of the second propagation part 822 perpendicular to the traveling direction of the light (the −X direction) is rectangular in shape. The area of this cross section decreases with increasing distance from the second incidence end face 822a. The thickness of the second propagation part 822 in the Z direction is constant regardless of the distance from the second incidence end face 822a. The width of the second propagation part 822 in the Y direction decreases with increasing distance from the second incidence end face 822a.

Next, the light to propagate through the core 82 will be described. Part of the incident light is incident on the first incidence end face 821a and propagates through the first propagation part 821 as first propagation light.

Another part of the incident light is incident on the second incidence end face 822a and propagates through the second propagation part 822 as second propagation light. The cross section of the second propagation part 822 perpendicular to the traveling direction of the second propagation light (the −X direction) decreases in area with increasing distance from the second incidence end face 822a. This makes it difficult for the second propagation light to remain in the second propagation part 822, and the second propagation light eventually moves to the first propagation part 821. The first propagation light and the second propagation light decease in diameter as they propagate through the first and second propagation parts 821 and 822. In the optical waveguide of the comparative example, the second propagation part 822 needs to be sharply pointed at the side of the front end 822b in order to make the second propagation light move to the first propagation part 821 with high efficiency. For example, the front end 822b has a radius of curvature of around 0.1 μm when viewed in cross section parallel to the XY plane.

The effects of the embodiment will now be described in comparison with the optical waveguide of the comparative example. In the optical waveguide of the comparative example, the second propagation part 822 has a thickness in the Z direction and a width in the Y direction of, for example, several micrometers each when viewed in the second incidence end face 822a. The second propagation part 822 has a length in the X direction of several tens to several hundreds of micrometers, for example. In this case, the second propagation part 822 gradually decreases in width in the Y direction from several micrometers to near zero across the length of several tens to several hundreds of micrometers. This means that the second propagation part 822 has an extremely high ratio of the thickness in the Z direction to the width in the Y direction (aspect ratio) particularly in the vicinity of the front end 822b of the second propagation part 822. The second propagation part 822 having such a configuration is extremely difficult to form. An example of methods for forming the second propagation part 822 is to form a photoresist etching mask on a dielectric layer by photolithography and pattern the dielectric layer by etching using the etching mask. In such a case, the etching mask has a portion of extremely high aspect ratio and is thus prone to collapse. Having a portion of extremely high aspect ratio, the second propagation part 822 itself is also vulnerable to chipping.

Unlike the core 82 of the optical waveguide of the comparative example, the core 32 of the optical waveguide according to the embodiment need not have the portion of extremely high aspect ratio. Consequently, the embodiment is free from the aforementioned problem with forming the core 82 of the optical waveguide of the comparative example. The optical waveguide (core 32) is thus easier to form, compared with the optical waveguide of the comparative example.

In the optical waveguide of the comparative example, the first and second incidence end faces 821a and 822a collectively form a single surface constituting the incidence part 82a. The dimension of the incidence part 82a in the Z direction is equal to the total sum of the dimensions of the first incidence end face 821a and the second incidence end face 822a in the Z direction. In the optical waveguide of the comparative example, the first propagation part 821 and the second propagation part 822 cannot be so large in thickness in the Z direction since the first and second propagation light needs to be prevented from entering multi mode. Accordingly, in the optical waveguide of the comparative example, the first incidence end face 821a and the second incidence end face 822a cannot be so large in dimension in the Z direction, and consequently, the incidence part 82a cannot be so large in dimension in the Z direction. It is thus difficult with the optical waveguide of the comparative example to increase the tolerance for misalignment of the incident light with respect to the incidence part 82a.

In contrast, according to the embodiment, the first incidence end face 321a and the second incidence end face 322a which constitute the incidence part 32a of the core 32 are spaced apart from each other in the Z direction. As will be detailed later with reference to simulation results, this configuration of the embodiment makes it possible to increase the tolerance for misalignment of the incident light 44 with respect to the incidence part 32a as compared with the optical waveguide of the comparative example.

A detailed description will now be given for clarifying that the embodiment makes it possible to increase the tolerance for misalignment of the incident light 44 with respect to the incidence part 32a as compared with the optical waveguide of the comparative example. When the incident light 44 deviates from its desired position, the amount of light that propagates through the core 32 decreases. The amount of the propagation light is expressed in terms of optical power efficiency. The optical power efficiency is the product of the coupling efficiency between the core and the incident light and the propagative efficiency of the propagation light.

As mentioned previously, when the laser diode 60 has a multilayer structure with layers stacked in the Z direction, it is desired to increase the tolerance for misalignment of the incident light 44 with respect to the incidence part of the core in the Z direction in particular. The following description will thus deal with the misalignment in the Z direction.

Figure 23:
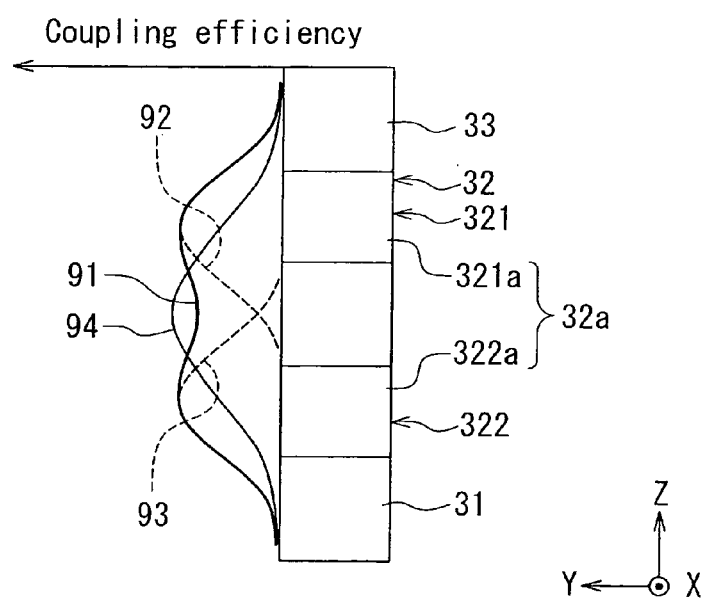
FIG. 23 is a conceptual diagram for explaining the coupling efficiency between the core of the optical waveguide according to the embodiment of the invention and laser light, and the coupling efficiency between the core of the optical waveguide of the comparative example and the laser light.

First, the coupling efficiency will be described with reference to FIG. 23. FIG. 23 is a conceptual diagram for explaining the coupling efficiency between the core 32 of the optical waveguide according to the embodiment and the incident light 44, and the coupling efficiency between the core 82 of the optical waveguide of the comparative example and the incident light. FIG. 23 schematically shows the relationship between the position of incidence of the incident light and the coupling efficiency. In FIG. 23, the reference numeral 91 designates the coupling efficiency between the core 32 and the incident light 44 (hereinafter, referred to as the coupling efficiency of the core 32). The reference numeral 92 designates the coupling efficiency between the first propagation part 321 and the incident light 44 (hereinafter, referred to as the coupling efficiency of the first propagation part 321). The reference numeral 93 designates the coupling efficiency between the second propagation part 322 and the incident light 44 (hereinafter, referred to as the coupling efficiency of the second propagation part 322). The reference numeral 94 designates the coupling efficiency between the core 82 and the incident light that is incident on the core 82 (hereinafter, referred to as the coupling efficiency of the core 82). In FIG. 23, the magnitude of each coupling efficiency is adjusted so that the respective coupling efficiencies have generally the same maximum values.

As shown in FIG. 23, the coupling efficiency of the core 82 (the reference numeral 94) has a unimodal distribution. The coupling efficiency of the core 32 (the reference numeral 91) has such a distribution that the coupling efficiency of the first propagation part 321 (the reference numeral 92) and that of the second propagation part 322 (the reference numeral 93) are combined with each other. While the shape of the distribution varies according to the configurations and arrangement of the first and second incidence end faces 321a and 322a, the distribution traces such a shape that the area of considerable coupling efficiencies spreads out in the Z direction as compared with the coupling efficiency of the core 82 (the reference numeral 94). In particular, when the first and second incidence end faces 321a and 322a are at some distance from each other, the coupling efficiency of the core 32 (the reference numeral 91) has a bimodal distribution such as shown in FIG. 23.

Next, the respective optical power efficiencies of the cores 32 and 82 will be described with reference to simulation results. First, a description will be given of a simulation that was performed to determine the respective optical power efficiencies of the cores 32 and 82. The simulation used a model of a practical example and a model of a comparative example which will be described below. In the simulation, the wavelength of the incident light to be incident on the cores 32 and 82 was set to 800 nm.

The model of the practical example contains the optical waveguide according to the embodiment. For the model of the practical example, tantalum oxide having a refractive index of 2.08 was selected as the material of the core 32, and aluminum oxide having a refractive index of 1.67 was selected as the material of the clad (clad layers 31 and 33). $W_{WGA}$ shown in FIG. 2 was set to 4 μm. $W_{WGC}$, $W_{WG4}$, and $W_{WG3}$ shown in FIG. 2 were set to 0.5 μm each. $H_{WGA}$, $H_{WGB}$, $H_{WGC}$, and $H_{WG3}$ shown in FIG. 2 were set to 50 μm, 100 μm, 10 μm, and 17.6 μm, respectively. $T_{WGA}$, $T_{WGB}$, $T_{WGC}$, $T_{WG3}$, and $D_{WG}$ shown in FIG. 3 were set to 0.4 μm each. $H_{WG4}$ and $T_{WG4}$ shown in FIG. 5 were set to 2.4 μm and 1.2 μm, respectively.

The model of the comparative example contains the optical waveguide of the comparative example. For the model of the comparative example, tantalum oxide having a refractive index of 2.08 was selected as the material of the core 82, and aluminum oxide having a refractive index of 1.67 was selected as the material of the clad. The first propagation part 821 was made to have the same dimensions as the first propagation part 321 of the model of the practical example. The thickness of the second propagation part 822 in the Z direction and the length of the same in the X direction were set to 0.8 μm and 150 μm, respectively. The width of the second propagation part 822 in the Y direction at the second incidence end face 822a was set to 4 μm. The radius of curvature of the front end 822b of the second propagation part 822 in cross section parallel to the XY plane was set to 0.1 μm.

Figure 24:
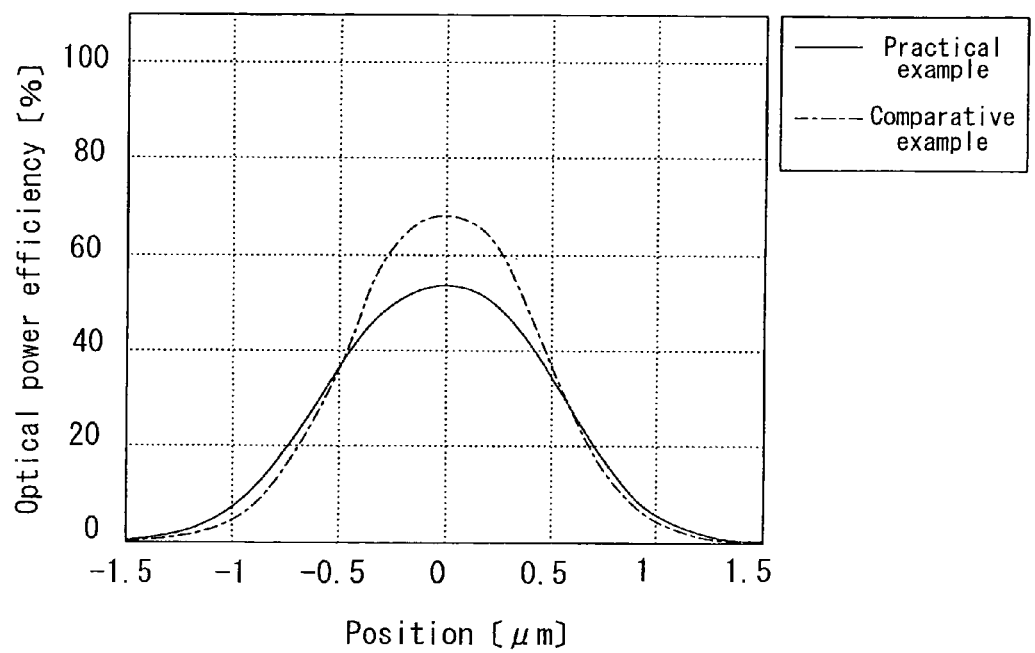
FIG. 24 is a characteristic chart showing the optical power efficiencies of a model of a practical example and a model of the comparative example.
Figure 25:
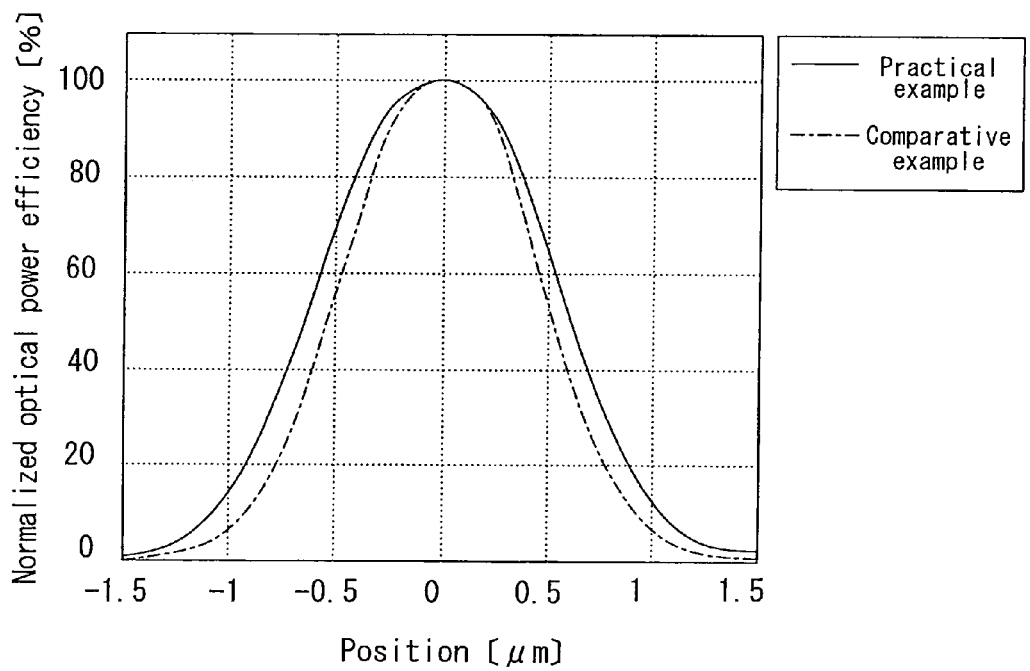
FIG. 25 is a characteristic chart showing the normalized optical power efficiencies of the model of the practical example and the model of the comparative example.

FIG. 24 is a characteristic chart showing the optical power efficiencies of the model of the practical example and the model of the comparative example. FIG. 25 is a characteristic chart showing normalized optical power efficiencies of the model of the practical example and the model of the comparative example. The normalized optical power efficiency refers to the optical power efficiency at each incident position of the incident light, divided by the maximum value of the optical power efficiency. In FIG. 24, the horizontal axis shows the incident position of the incident light in the Z direction, and the vertical axis shows the optical power efficiency. In FIG. 25, the horizontal axis shows the incident position of the incident light in the Z direction, and the vertical axis shows the normalized optical power efficiency. In FIG. 24 and FIG. 25, the position 0 (zero) indicates that the center of the incident light coincides with the center of the incidence part 32a or 82a in the Z direction. As shown in FIG. 24, the model of the practical example has a maximum optical power efficiency lower than that of the model of the comparative example.

As shown in FIG. 24 and FIG. 25, the distribution of the optical power efficiencies and the distribution of the normalized optical power efficiencies of the model of the practical example trace such a shape that the area of considerable optical power efficiencies or normalized optical power efficiencies spreads out in the direction of the horizontal axis (the Z direction) as compared with the model of the comparative example. As has been described with reference to FIG. 23, the reason is that the distribution of the coupling efficiencies of the core 32 has such a shape that the area of considerable coupling efficiencies spreads out in the Z direction as compared with the coupling efficiencies of the core 82. It should be noted that in the model of the practical example, the optical power efficiency and the normalized optical power efficiency have a unimodal distribution as shown in FIG. 24 and FIG. 25. Depending on the configurations and arrangement of the first and second incidence end faces 321a and 322a, however, the optical power efficiency and the normalized optical power efficiency may have a bimodal distribution.

The tolerance for misalignment of the incident light 44 with respect to the incidence part 32a can be defined by, for example, the allowable lower limit of the normalized optical power efficiency. In such a case, the distance between the two points at the lower limit in the distribution of the normalized optical power efficiency indicates the tolerance for misalignment. As shown in FIG. 25, the model of the practical example has a tolerance greater than that of the model of the comparative example.

As can be seen from the foregoing simulation results, it is possible according to the embodiment to increase the tolerance for misalignment of the incident light 44 with respect to the incidence part 32a as compared with the optical waveguide of the comparative example.

The present invention is not limited to the foregoing embodiment, and various modifications may be made thereto. For example, the core 32 may further include another propagation part that extends toward the medium facing surface 12a so as to be continuous with the third propagation part 323.

In the first propagation part 321, the first introducing portion 3211 and the first tapered portion 3212 may be greater in thickness than the first straight portion 3213. Similarly, in the second propagation part 322, the second introducing portion 3221 and the second tapered portion 3222 may be greater in thickness than the second straight portion 3223.

In the thermally-assisted magnetic recording head according to the embodiment, the light source unit 50 which includes the laser diode 60 is integrated with the slider 10 which includes the optical waveguide, so that the light emitted from the laser light 60 is directly incident on the core 32. The thermally-assisted magnetic recording head of the present invention may have a configuration other than the aforementioned configuration, and may be configured so that light from a light source that is positioned away from the slider 10 is incident on the core 32 through optical elements such as an optical fiber.

The optical waveguide of the present invention is applicable not only to thermally-assisted magnetic recording heads but also to optical integrated circuits and the like for use in optical transmission components.

It is apparent that the present invention can be carried out in various forms and modifications in the light of the aforementioned descriptions. Accordingly, within the scope of the following claims and equivalents thereof, the present invention can be carried out in forms other than the aforementioned most preferable embodiment.

What is claimed is:

1. An optical waveguide comprising a core and a clad, and allowing incident light to be incident thereon, wherein:
   the core includes a first propagation part, a second propagation part, a third propagation part, and a coupling part that couples the first to third propagation parts together;
   the first propagation part has a first incidence end face on which part of the incident light is incident, and a first emission part that emits first propagation light, the first propagation light being light that has been incident on the first incidence end face and propagated through the first propagation part;
   the second propagation part has a second incidence end face on which another part of the incident light is incident, and a second emission part that emits second propagation light, the second propagation light being light that has been incident on the second incidence end face and propagated through the second propagation part;
   the first propagation part and the second propagation part are spaced apart from each other;
   the coupling part includes a first incidence part on which the first propagation light emitted from the first emission part is incident, a second incidence part on which the second propagation light emitted from the second emission part is incident, and a third emission part;

in the coupling part, a first light wave resulting from the first propagation light incident on the first incidence part and a second light wave resulting from the second propagation light incident on the second incidence part occur, and the first and second light waves interfere with each other to generate third propagation light, the third propagation light being light to be emitted from the third emission part; and the third propagation part has a third incidence part on which the third propagation light emitted from the third emission part is incident, the third propagation part propagating the third propagation light.

2. The optical waveguide according to claim 1, wherein the third propagation part propagates the third propagation light in single mode.

3. The optical waveguide according to claim 1, wherein:
the first light wave occurs from interference of a plurality of light waves that each result from the first propagation light incident on the first incidence part and that are different from each other in the number of times of reflection by an outer periphery of the coupling part; and
the second light wave occurs from interference of a plurality of light waves that each result from the second propagation light incident on the second incidence part and that are different from each other in the number of times of reflection by the outer periphery of the coupling part.

4. The optical waveguide according to claim 1, wherein the first propagation part and the second propagation part are of identical shape.

5. The optical waveguide according to claim 1, wherein:
the first propagation part includes a first tapered portion whose cross section perpendicular to a traveling direction of the first propagation light decreases in area with decreasing distance to the first emission part; and
the second propagation part includes a second tapered portion whose cross section perpendicular to a traveling direction of the second propagation light decreases in area with decreasing distance to the second emission part.

6. The optical waveguide according to claim 5, wherein:
the first propagation part further includes a first straight portion that lies between the first tapered portion and the first emission part, a cross section of the first straight portion perpendicular to the traveling direction of the first propagation light being constant in area regardless of the distance from the first emission part; and
the second propagation part further includes a second straight portion that lies between the second tapered portion and the second emission part, a cross section of the second straight portion perpendicular to the traveling direction of the second propagation light being constant in area regardless of the distance from the second emission part.

7. The optical waveguide according to claim 6, wherein the first straight portion propagates the first propagation light in single mode, and the second straight portion propagates the second propagation light in single mode.

8. A thermally-assisted magnetic recording head comprising:
the optical waveguide according to claim 1; and
a magnetic pole that produces a write magnetic field for writing data on a magnetic recording medium,
wherein the optical waveguide propagates light that is for use in thermally-assisted magnetic recording.

9. The thermally-assisted magnetic recording head according to claim 8, further comprising a plasmon generator that allows a surface plasmon to be excited thereon based on the light propagating through the optical waveguide and that generates near-field light based on the surface plasmon.

10. A head gimbal assembly comprising the thermally-assisted magnetic recording head according to claim 8, and a suspension that supports the thermally-assisted magnetic recording head.

11. A magnetic recording device comprising: a magnetic recording medium; the thermally-assisted magnetic recording head according to claim 8; and a positioning device that supports the thermally-assisted magnetic recording head and positions the thermally-assisted magnetic recording head with respect to the magnetic recording medium.

* * * * *